(12) United States Patent
Matsueda

(10) Patent No.: US 7,876,465 B2
(45) Date of Patent: Jan. 25, 2011

(54) INFORMATION PROCESSING APPARATUS AND WORKFLOW GENERATION METHOD

(75) Inventor: Kazutaka Matsueda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1078 days.

(21) Appl. No.: 11/637,078

(22) Filed: Dec. 12, 2006

(65) Prior Publication Data
US 2007/0136117 A1 Jun. 14, 2007

(30) Foreign Application Priority Data
Dec. 13, 2005 (JP) .............................. 2005-359533

(51) Int. Cl.
*G06F 15/00* (2006.01)
*G06F 15/16* (2006.01)

(52) U.S. Cl. ..................................... 358/1.15; 709/229

(58) Field of Classification Search ................ 358/1.15, 358/1.14, 1.13, 1.16, 1.18, 1.19, 296, 1.9, 358/400, 474; 709/225, 224, 229, 201, 230, 709/227, 240; 455/414.1, 74; 382/162; 725/32, 725/34; 713/167, 189, 193
See application file for complete search history.

(56) References Cited

U.S. PATENT DOCUMENTS

| | | | |
|---|---|---|---|
| 6,985,243 | B1 | 1/2006 | Matsueda |
| 7,239,410 | B2 | 7/2007 | Matsueda |
| 7,242,488 | B2 | 7/2007 | Matsueda |
| 7,256,907 | B2 | 8/2007 | Matsueda |
| 7,528,978 | B2 | 5/2009 | Randt |
| 7,684,066 | B2 * | 3/2010 | Shirai .......................... 358/1.14 |
| 2003/0179404 | A1 | 9/2003 | Matsueda |
| 2004/0064786 | A1 | 4/2004 | Ikeda et al. |
| 2004/0193465 | A1 | 9/2004 | Sangroniz et al. |
| 2004/0196470 | A1 | 10/2004 | Christensen |
| 2005/0206913 | A1 | 9/2005 | Matsuda et al. |
| 2005/0275882 | A1 | 12/2005 | Yasuda et al. |
| 2007/0133047 | A1 | 6/2007 | Matsueda |
| 2007/0136117 | A1 | 6/2007 | Matsueda |

FOREIGN PATENT DOCUMENTS

| | | |
|---|---|---|
| JP | 2001195470 | 7/2001 |
| JP | 2004164570 | 6/2004 |
| JP | 2005-295515 A | 10/2005 |

* cited by examiner

*Primary Examiner*—Saeid Ebrahimi Dehkordy
(74) *Attorney, Agent, or Firm*—Fitzpatrick, Cella, Harper & Scinto

(57) ABSTRACT

According to the claimed invention, an information processing apparatus generating a workflow that defines a processing order of a plurality of processes, and having a storage that stores workflow information used to define processing in the respective processes included in the workflow, comprises a reception unit adapted to receive a processing status of a processing step of interest of the plurality of processes defined in the workflow from a device executing the processing step of interest, a checking unit adapted to check if the processing status of the processing step of interest matches a workflow generation condition, and a first generation unit adapted to generate, when the checking unit determines that the processing status of the processing step of interest matches the workflow generation condition, a workflow based on the workflow information stored in the storage unit and the processing status of the processing step of interest.

21 Claims, 25 Drawing Sheets

JOBTICKET
       #---361212
1001 ~ JobName                    361212-1-2-3-1/2

CLIENT                     kazuta
       PAYER                      matsueda
       DESTINATION                xxxxxx-yyyyyy Server                     stargate
       START DATA & TIME          2005/04/14  19:00:01  JST 1002 ~ PROCESS A1: DOCUMENT RECEPTION APPLICATION
           <PROCESSING EXECUTANT>  System
           <INPUT FILE NAME>       aaabbbccc.pdf
           <FILE SIZE>             52MByte
           <HOT FOLDER>            folder1
           <NUMBER OF COPIES>      10 COPIES
           <START TIME>            2005/04/14  19:00:01
           <END TIME>              2005/04/14  19:00:03

1003 ~ PROCESS A2: LAYOUT APPLICATION
           <PROCESSING EXECUTANT>  yamanaka
           <LAYOUT>                A3 1up  DOUBLE-SIDED CASE BINDING
           <COVER>                 BOARD 1
           <NUMBER OF OUTPUT COPIES> 10 COPIES
           <NUMBER OF PRINTED PAGES> 120 PAGES 1004 ~ PROCESS A3: ENGINE
           <DEVICE NAME>           ABCD
1005 ~     <OUTPUT PAGE>           3-1/2  50 PAGES
1006 ~     <TALLY PASSWORD>        a3$DtGh)
           <NON-OUTPUT JOB>        3-2/2  70 PAGES
1007 ~ PROCESS A4: FINISHER
1008 ~ PROCESS A5: CONFIRMATION
1009 ~ JobEnd                     361212-1-2-3-1/2
```

FIG. 11

```
JOBTICKET
---361212
JobName                              361212-1-2-3-2/2

CLIENT                               kazuta
PAYER                                matsueda
DESTINATION                          xxxxxx-yyyyyy Server                               stargate
START DATA & TIME                    2005/04/14  19:00:01  JST PROCESS A1: DOCUMENT RECEPTION APPLICATION
       <PROCESSING EXECUTANT>        System
       <INPUT FILE NAME>             aaabbbccc.pdf
       <FILE SIZE>                   52MByte
       <HOT FOLDER>                  folder1
       <NUMBER OF COPIES>            10 COPIES
       <START TIME>                  2005/04/14  19:00:01
       <END TIME>                    2005/04/14  19:00:03

PROCESS A2: LAYOUT APPLICATION
       <PROCESSING EXECUTANT>        yamanaka
       <LAYOUT>                      A3 1up DOUBLE-SIDED CASE BINDING
       <COVER>                       BOARD 1
       <NUMBER OF OUTPUT COPIES>     10 COPIES
       <NUMBER OF PRINTED PAGES>     120 PAGES PROCESS A3: ENGINE
       <DEVICE NAME>                 ABCD
       <OUTPUT PAGE>                 3-1/2  50 PAGES
       <TALLY PASSWORD>              a3$DtGh)
       <NON-OUTPUT JOB>              3-2/2  70 PAGES
PROCESS A4: FINISHER
PROCESS A5: CONFIRMATION
JobEnd                               361212-1-2-3-2/2
```

- 402
- 1101 → JobName
- 1102 → <TALLY PASSWORD>
- 1103 → JobEnd

```
JOBTICKET
---361212
JobName                      361212-1-2-3-1/2-4-2/2
```

~~~~~~~~~~~~~~~~~~~~~~~~~~~~~~~~~~~~~~~~~~~

```
PROCESS A3: ENGINE
        <DEVICE NAME>        ABCD
        <OUTPUT PAGE>        3-1/2  50 PAGES
        <TALLY PASSWORD>     a3$DtGh)
        <NON-OUTPUT JOB>     3-2/2  70 PAGES
PROCESS A4: FINISHER
        <DEVICE NAME>        NearLine Finisher BB
        <PROCESSED PAGE>     4-1/2  48 PAGES
        <TALLY PASSWORD>     44ppp4444m
        <UNPROCESSED JOB>    4-2/2  2 PAGES

PROCESS A5: CONFIRMATION

JobEnd                       361212-1-2-3-2/2
```

802

```
JOBTICKET
---361212
JobName                      361212-1-2-3-2/2
```

~~~~~~~~~~~~~~~~~~~~~~~~~~~~~~~~~~~~~~~~~~~

```
PROCESS A3: ENGINE
        <DEVICE NAME>        ABCD
        <OUTPUT PAGE>        3-1/2  50 PAGES
        <TALLY PASSWORD>     a3$DtGh)
        <NON-OUTPUT JOB>     3-2/2  70 PAGES
PROCESS A4: FINISHER
        <DEVICE NAME>        NearLine Finisher BB
        <PROCESSED PAGE>     70 PAGES

PROCESS A5: CONFIRMATION
```

FIG. 15

```
JOBTICKET
---361212
JobName              361212-1-2-3-1/2-4-2/2
SubJobName           361212-1-2-3-2/2
~~~~~~~~~~~~~~~~~~~~~~~~~~~~~~~~~~~~~~~~
~~~~~~~~~~~~~~~~~~~~~~~~~~~~~~~~~~~~~~~~

PROCESS A3: ENGINE
        <DEVICE NAME>        ABCD
        <OUTPUT PAGE>        3-1/2 50 PAGES
        <TALLY PASSWORD>     a3$DtGh)
        <NON-OUTPUT JOB>     3-2/2 70 PAGES
PROCESS A4: FINISHER
        <DEVICE NAME>        NearLine Finisher BB
        <PROCESSED PAGE>     72 PAGES

PROCESS A5: CONFIRMATION

JobEnd               361212-1-2-3-1/2-4-2/2
```

901 (ticket), 902 → SubJobName

```
JOBTICKET
---361212
JobName              361212-1-2-3-1/2-4-2/2
SubJobName           361212-1-2-3-2/2
```

~~~~~~~~~~~~~~~~~~~~~~~~~~~~~~~~~~~~~~~~~

```
PROCESS A3: ENGINE
        <DEVICE NAME>            ABCD
        <OUTPUT PAGE>            3-1/2  50 PAGES
        <TALLY PASSWORD>         a3$DtGh)
        <NON-OUTPUT JOB>         3-2/2  70 PAGES
PROCESS A4: FINISHER
        <DEVICE NAME>            NearLine Finisher BB
        <PAGE TO BE PROCESSED>   72 PAGES
        <ALREADY PROCESSED PAGE> A3  72 PAGES
        <NUMBER OF PROCESSED COPIES  6 COPIES
        <OPERATOR NAME>          matsui
        <WORK CONTENTS>          CASE BINDING

PROCESS A5: CONFIRMATION

JobEnd                           361212-1-2-3-1/2-4-2/2
```

1702 points to the PROCESS A4: FINISHER section.

INFORMATION PROCESSING APPARATUS AND WORKFLOW GENERATION METHOD

BACKGROUND OF THE INVENTION

1. Field of the Invention

The present invention relates to an information processing apparatus for processing data in accordance with a workflow defined in advance, a workflow generation method, and a program and, more particularly, to an information processing apparatus which can prevent interruption of entire print processing due to a failure even when a failure or the like has occurred during the processing, a workflow generation method, and a program.

2. Description of the Related Art

In the commercial print industry, print processing using large-scale printing apparatuses such as offset reproduction printing presses and the like has prevailed. In the print industry, the works progress while going through various processes such as document reception, design and layout, comprehensive layout (presentation by means of a printer output), correction of the press (layout correction and color correction), proof impression (proof print), creation of layout paper, printing, finishing processing, and delivery.

On the other hand, recently, electrophotographic printing apparatuses and ink-jet printing apparatuses have been speeded up and have gained high image quality. Along with such technical trend, a market called Print On Demand (to be abbreviated as POD hereinafter) that handles jobs of relatively small lots by quick delivery without using any huge apparatuses or systems is known.

The POD market adopts digital print using digital data in place of the conventional large-scale printing press or printing system. For example, the POD market uses a digital image processing apparatus such as a digital copying machine, digital multi-functional peripheral equipment (MFP), and the like. In such POD market, digitization has progressed compared to the conventional print industry, and management and control using computers have become widespread.

For example, the POD market generates a schedule to complete processing before due date. Furthermore, the POD market generates a POD workflow by combining a plurality of processes and executes print processing using a job ticket so as to efficiently go through the procedure. The job ticket is digital data which instructs print work processes. A print shop which undertakes POD can execute print processing, as described in the job ticket, and such technique is indispensable upon automating print processing.

Japanese Patent Application Laid-Open No. 2004-164570 discloses a method of progressing workflow processing using a job ticket. Japanese Patent Application Laid-Open No. 2004-164570 describes a technique for generating a job ticket corresponding to the generated workflow, and executing required processing according to the job ticket issued from a workflow generation apparatus.

As a finisher which executes finishing processing of printed materials, a near-line finisher, which is connected to a printing apparatus and a computer as a control apparatus of the printing apparatus via a communication is commercially available. The near-line finisher has excellent expandability and substitutability of functions since it is an apparatus independent from the printing apparatus. The near-line finisher contributes to automation of processing since it receives a digital job ticket via a communication and can execute processing described in that job ticket.

Furthermore, Japanese Patent Application Laid-Open No. 2001-195470 describes a technique for generating a workflow that assumes errors upon progressing the processing of the workflow. Japanese Patent Application Laid-Open No. 2001-195470 describes a technique for generating work processing, upon occurrence of an abnormality when consistency restriction rules are broken, based on the consistency restriction rules generated to obtain a designated output result.

Since the technique described in Japanese Patent Application Laid-Open No. 2001-195470 defines the processing upon occurrence of an error (to be referred to abnormality work processing hereinafter) in advance, dynamic abnormality processing cannot be done in accordance with the occurrence timing of an error. For example, a case will be examined wherein in a workflow for binding printed materials for 10 pages to generate two copies of books, an error has occurred during printing the fifth page of the second book. In this case, the print processing for 10 pages of the first book is complete. For this reason, the first book may advance to the next process, e.g., the bookbinding process. In this way, by advancing data or intermediate products, which can advance to the next process, to the next process as much as possible, the workflow processing can be efficiently done. However, the technique described in Japanese Patent Application Laid-Open No. 2001-195470 cannot generate a workflow by judging the processing status at the time of occurrence of an error, since the processing upon occurrence of an error is registered in advance.

Even when the technique described in Japanese Patent Application Laid-Open No. 2004-164570 is used, since it defines abnormality work processing in advance, the abnormality work processing cannot be executed if an error has occurred at an undefined timing. If the abnormality work processing is defined to cope with errors that may occur at every timings, the data volume for definition becomes huge.

As described above, since the prior arts cannot change the appropriate processing contents or processing target depending on the processing status of the workflow, they cannot efficiently progress the workflow processing based on the processing status.

SUMMARY OF THE INVENTION

The present invention has been made in consideration of the aforementioned prior arts, and has as its object to efficiently progress processing by dynamically generating a workflow when an event that matches a predetermined condition has occurred during execution of the workflow.

In order to achieve the above object, the present invention comprises the following arrangement.

That is, an information processing apparatus which generates a workflow that defines a processing order of a plurality of processes, and has a storage unit that stores workflow information used to define processing in the respective processes included in the workflow comprises: a reception unit adapted to receive a processing status of a processing step of interest of the plurality of processes defined in the workflow from a device which executes processing of the processing step of interest; a checking unit adapted to check if the processing status of the processing step of interest received by the reception unit matches a workflow generation condition; and a first generation unit adapted to generate, when the checking unit determines that the processing status of the processing step of interest matches the workflow generation condition, a workflow based on the workflow information stored in the storage unit and the processing status of the processing step of interest.

According to the present invention, when an event that matches a predetermined condition has occurred, a workflow is dynamically generated to efficiently progress the processing.

Further features of the present invention will become apparent from the following description of exemplary embodiments (with reference to the attached drawings).

BRIEF DESCRIPTION OF THE DRAWINGS

FIG. 10 shows a configuration example of a job ticket;

FIG. 11 shows the configuration of the job ticket;

FIG. 14 shows configuration examples of job tickets 704 and 702;

FIG. 15 shows the configuration of a combined job ticket;

FIG. 16 shows an example of a job ticket after execution of an activity associated with the combined job ticket;

DESCRIPTION OF THE EMBODIMENTS

First Embodiment

Figure 1:
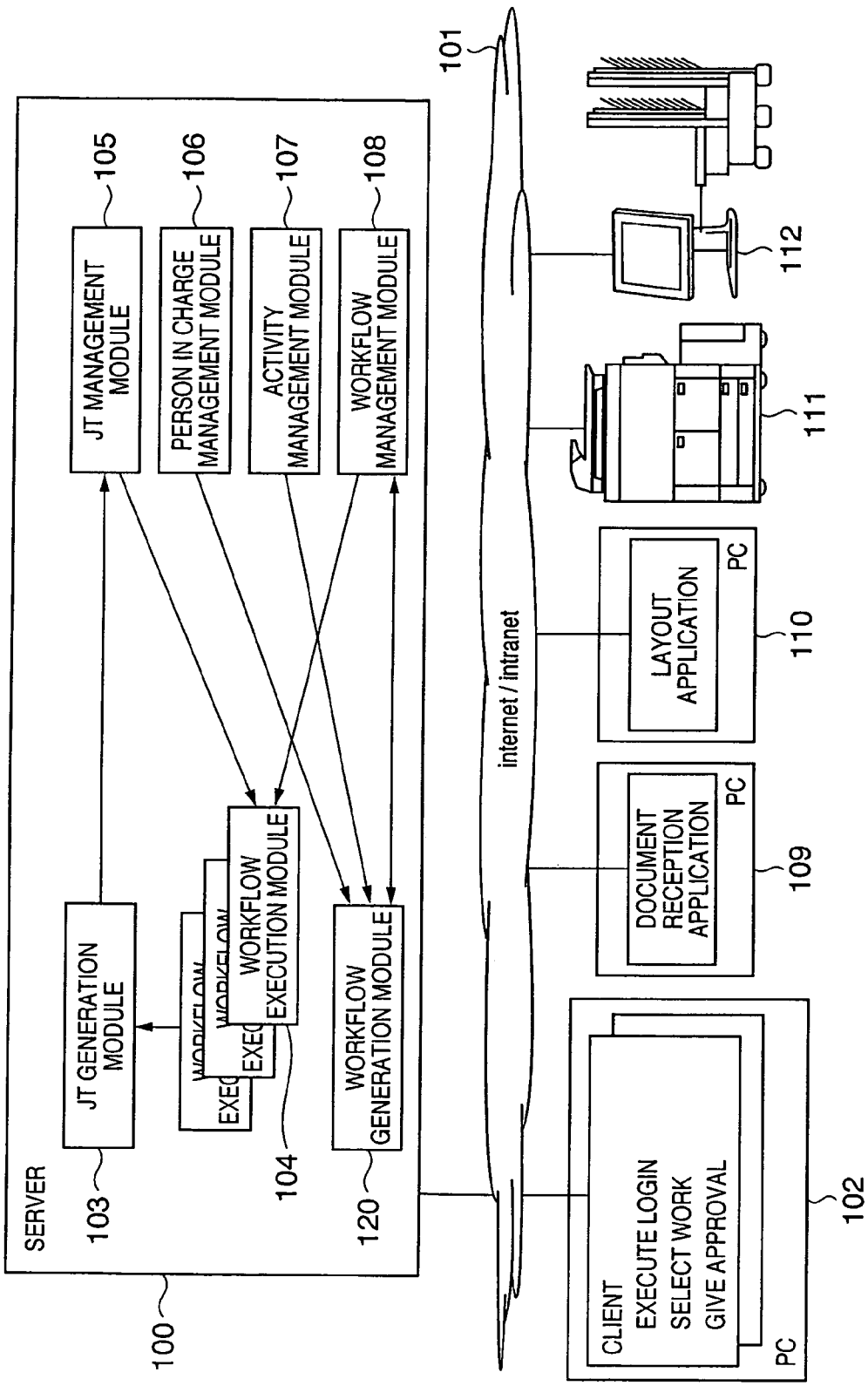
FIG. 1 is a schematic system diagram of a printing system according to the first embodiment of the present invention.

Preferred embodiments of the present invention will be described in detail hereinafter with reference to the accompanying drawings.

Definition

Some terms used in this embodiment will be explained and defined. A near-line finisher is a finisher which comprises means for communicating with an external apparatus such as a host computer or the like. The processing contents to be executed by the near-line finisher can be set by inputting a job ticket from the external apparatus via a communication. Also, the processing contents can be set by user's manual inputs from a console of the finisher.

A workflow is the flow of print processing including up to finishing processing. In this embodiment, the workflow is information described in a format that can be processed by a computer. The workflow is also called workflow information. Note that this embodiment describes the workflow as the flow of print processing, but the present invention is not limited to the print processing. The workflow is information which describes activities (also called processes) that form the workflow in the order of processing. Each activity describes an execution subject of processing and the contents of the processing to be executed. The execution subject need not always be a device. For example, the name, appointment, or the like of a person in charge may be described as the execution subject. Also, the processing contents may be a general description of an operation, and a detailed description of an object of the processing may be omitted. However, since a job ticket is generated based on the execution subjects and operations described in correspondence with activities, each activity is described using a predetermined format (grammar) and words (reserved words) in place of a description using a natural language.

A unit of a group of data and parameters to be executed according to the workflow is called a job (especially, a print job in this embodiment). The workflow is executed in job units. For example, the workflow includes a document reception process for inputting document data, a layout process for laying out the document data input in the document reception process on pages, a print process for printing the document data laid out in the layout process, and a finishing process for applying finishing processing to sheets printed in the print process.

The workflow information includes device information required to execute respective processes, information indicating the processing order of respective processes, layout information required to specify the layout of a document in the layout process, print setting information required to specify a print method in the print process, and finishing setting information required to specify the contents of the processing of the finishing process.

A job ticket is a group of data that describe the processing contents in respective processes of the print processing for each job, and is also called job control information. That is, the job ticket is digital data of a work instruction which describes information indicating work instruction contents. The job ticket is data described in, e.g., a JDF (Job Definition Format) format defined using XML (extensive Markup Language). However, even a job ticket described in a non-standard format can be used for the present invention. The job ticket describes parameters and the like of processing to be executed by devices which implement respective activities that form the workflow. Note that the devices include a document reception application, layout application, and the like which run on a general-purpose computer, in addition to individual devices such as a printer, near-line finisher, image scanner, and the like. This embodiment often terms independent devices in terms of hardware and devices implemented by software logical devices.

Each device executes processing according to parameters described in the job ticket. In this embodiment, in addition to the processing contents to be executed, the state of the complete processing (including incomplete processing) is described by the device that executed the processing. Such states are written in the job ticket after completion of the processing. A detailed configuration example of the job ticket will be described later with reference to FIG. 3 and the like.

<Arrangement of Information Processing Apparatus>

Figure 25:
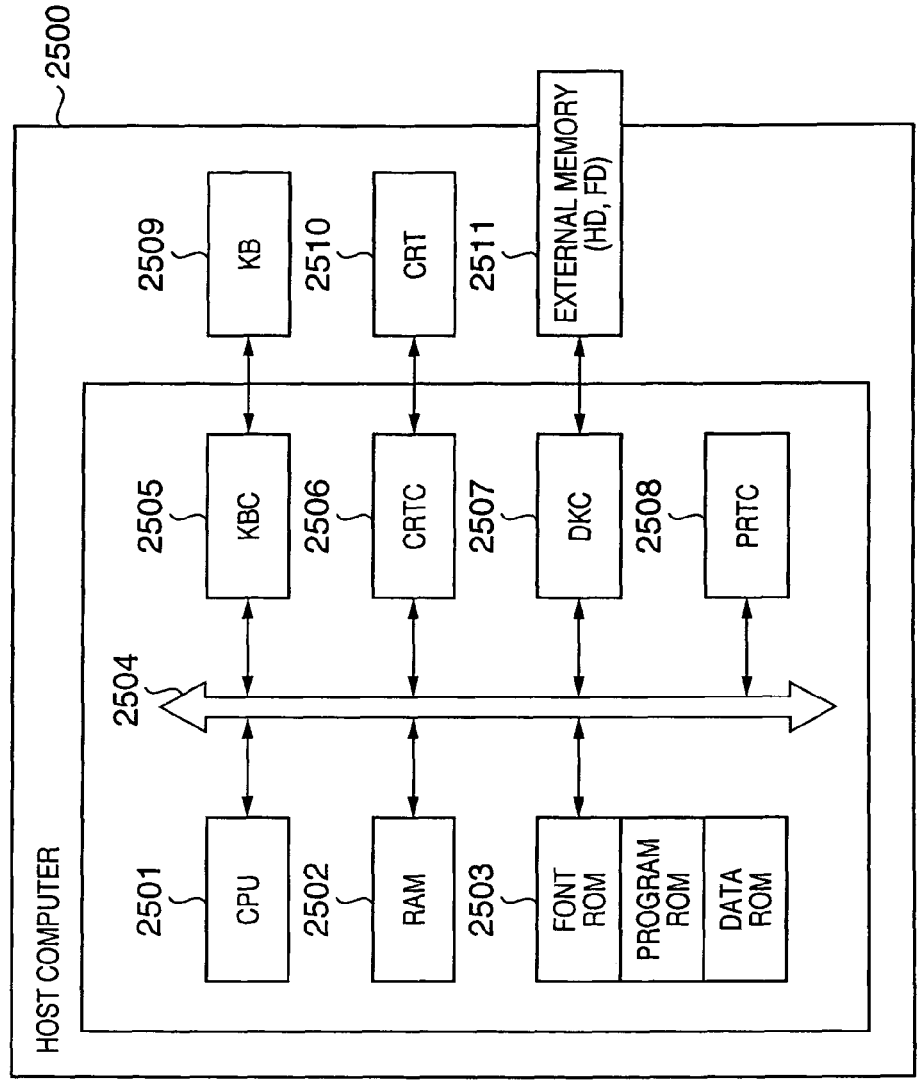
FIG. 25 is a block diagram of a computer.

FIG. 25 is a block diagram for explaining an information processing apparatus of this embodiment. Note that the present invention can be applied to a standalone apparatus, a system including a plurality of apparatuses, and a system that implements processing by making connections via a network such as a LAN, WAN, or the like, as long as they can implement the functions of the present invention, unless otherwise specified. The information processing apparatus is described as a host computer, but the present invention is not limited to this. The information processing apparatus basically has the same arrangement as that in FIG. 25. Hence, for example, an MIS server to be described later has the same arrangement as that in FIG. 25.

Referring to FIG. 25, a host computer 2500 comprises a CPU 2501. The CPU 2501 executes document processing including figures, images, text, table (including a spreadsheet or the like), and the like based on a program ROM of a ROM 2503, document processing program, or the like. The CPU 2501 systematically controls respective devices connected to a system bus 2504.

The program ROM of this ROM 2503 or an external memory 2511 stores an operating system (to be abbreviated as an OS hereinafter) as a control program of the CPU 2501, and the like. A font ROM of the ROM 2503 or the external memory 2511 stores font data and the like used in the document processing. A data ROM of the ROM 2503 or the external memory 2511 stores various data used upon execution of the document processing and the like.

A RAM 2502 serves as a main memory, work area, and the like of the CPU 2501. A keyboard controller (KBC) 2505 controls key inputs from a keyboard 2509 and a pointing device (not shown). A CRT controller (CRTC) 2506 controls display on a CRT display (CRT) 2510.

A disk controller (DKC) 2507 controls access to the external memory 2511 such as a hard disk (HD) or the like, which stores a boot program, applications, font data, a printer control command generation program (to be referred to as a printer driver hereinafter), and the like. The DKC 2507 can control access to a floppy® disk.

A printer controller (PRTC) 2508 is connected to an external device via a predetermined two-way interface 2521, and executes communication control processing with the external device. Note that the CPU 2501 executes rasterize processing of outline fonts onto, e.g., a display information RAM assured on the RAM 2502, and implements a WYSIWYG function on the CRT 2510.

The CPU 2501 opens various registered windows based on commands designated by a mouse cursor (not shown) or the like on the CRT 2510, and executes various kinds of data processing. The user opens a window associated with print settings upon execution of printing, and can make settings of a printer, and a print processing method for the printer driver including selection of a print mode. Note that an MIS described in this application has basically the same arrangement as that of the information processing apparatus shown in FIG. 25.

<System Arrangement>

FIG. 1 is a schematic system diagram of a printing system according to the first embodiment of the present invention. Referring to FIG. 1, the printing system comprises a printing system server 100, a network 101 as the Internet or an intranet in a corporation, and a client 102 which comprises a personal computer, software, and the like. Furthermore, the printing system further comprises as devices that implement the activities of the workflow: a personal computer 109 in which a document reception application is installed (to be referred to as a document reception application 109 hereinafter), a personal computer 110 in which a layout application is installed (to be referred to as a layout application 110 hereinafter), and a printer (print engine) 111 for printing data on print sheets, and a near-line finisher 112 which executes finishing processing such as bookbinding, trimming, and the like.

The document reception application 109 is application software used to receive a document. The document reception application 109 converts data such as input image data, text data, and the like into a predetermined format (e.g., PDF (Portable Document Format)). The document reception application 109 may be installed in the client 102 or may exist in another computer on the network 101. The layout application 110 is a program which designates an output result as a printed material to have digital data as layout paper. The layout application 110 allows the user to make layout designations such as "make double-sided print processing in 2-in-1", "make case binding print processing in 1-in-1", and so forth on an easy-to-see UI. The layout application 110 converts digital data of a document output from the document reception application 109 in accordance with the layout designations. The converted digital data is that which is to be input to the print engine 111. This digital data describes, using a predetermined PDL (page description language), pages described in the PDF according to the layout based on the layout designations or the pages described in the PDF. In either case, the digital data has a format which can be interpreted by the print engine 111. Devices such as the document reception application 109, layout application 110, and the like, which are used in the workflow, correspond to the job ticket. On the computer, a program which receives, e.g., a job ticket, displays it, accepts user's inputs, and transmits the job ticket together with the accepted inputs to the server 100 (to be referred to as a job ticket processing program hereinafter) runs. This program can set up parameters of respective activities described in the job ticket in devices which execute the corresponding activities, as needed.

The printer 111 executes print processing on print sheets based on the input digital data (to be also referred to as print data hereinafter). The near-line finisher 112 applies finishing processing to printed materials brought with the operator in accordance with job control information such as a job ticket or the like designated via the network unlike an in-line finisher attached to a printing apparatus. An off-line finisher which is similar to the near-line finisher is known. However, this off-line finisher is not connected to the network, and receives job control information such as a job ticket or the like via a digital medium such as a flexible disk or the like. The near-line finisher starts processing after the operator manually places printed materials to be processed at a predetermined position. For this reason, the operator inputs a processing start trigger. In this case, the operator can issue a job combining instruction and the like, as shown in FIG. 10.

The server 100 includes a job ticket (JT) generation module 103, workflow execution module 104, job ticket (JT) management module 105, user (person in charge) management module 106, activity management module 107, workflow management module 108, and workflow generation module 120 (first generation unit). The job ticket management module 105, user management module 106, activity management module 107, and workflow management module 108 are management programs having storage areas implemented by a memory, external memory, or the like, or storage areas themselves. The job ticket generation module 103 (second generation unit), workflow execution module 104, and workflow generation module 120 are implemented when the server computer 100 executes programs. Of course, these modules may be implemented by hardware having circuits equivalent to these programs.

The workflow generation module 120 is a module which allows the user to define a workflow using activities which have already been defined and are stored in the activity management module 107. The workflow management module 108 stores the defined workflow. In this case, whether or not a login user has an authority to define the workflow may be checked by collating with the authority of that user saved in the person in charge management module 106. When an event such as an error or the like, which requires to interrupt processing, has occurred in an activity in the workflow which is in execution, the workflow generation module 120 copies workflow information of the workflow which is in execution as well as the activity that has caused the event. It is desirable to copy the workflow so as to have the activity that has caused the event as the head, but the workflow may be copied to include activities before that activity. The workflow based on the copied workflow information is executed parallel to the original workflow. In this case, one workflow is executed for data whose processing can be proceeded with intact as an object. The other workflow is executed for data whose processing must be interrupted due to the event such as an error or the like as an object. For this reason, after the workflow generation module 120 generates the workflow information, it changes parameters of each workflow information. Of course, "parallel" in this case means that a plurality of pieces of workflow processing as a whole are executed parallelly. In other words, "parallel" does not mean that common activities in a plurality of workflows are simultaneously executed at a given instance.

Note that this embodiment calls a workflow obtained by fully or partially copying an original workflow as a derivative workflow. Also, this embodiment calls generation of a new derivative workflow as derivation of a workflow.

The job ticket generation module 103 generates a job ticket corresponding to the workflow to be executed by the workflow execution module, and stores it in the job ticket management module 105. The workflow execution unit may generate a job ticket. Upon deriving a workflow, the job ticket generation module 103 generates and executes a job ticket corresponding to the derivative workflow.

The workflow execution module 104 simultaneously executes one or more workflows stored in the workflow management module 108. The workflow execution unit 104 dynamically updates a job ticket before execution of each activity so as to execute the workflow, thus implementing flexible execution of the workflow. The job ticket management module 105 holds the generated job ticket until the workflow ends. Since the job ticket is transmitted from a device which executes each activity to the workflow execution unit 104 upon completion of execution of the activity, the workflow execution module 104 receives that job ticket and the job ticket management module 105 holds it. The received job ticket is updated for the next activity. The person in charge (user) management module 106 holds the authority of the login user and the like. The activity management module 107 stores and manages activities that mean work processes to be executed in the workflow. For example, definitions such as "a foreperson makes document reception", "a temporary employee makes layout", "a department director gives approval", "a print operator makes case binding printing", and so forth can be registered as activities. Normally, each activity includes a combination of a person in charge and work. The user can define the workflow by joining activities stored in the activity management module 107. The workflow management module 108 stores and manages workflows which are defined in advance by the user and administrator. The workflow management module 108 manages a plurality of user-defined workflows such as "case binding printing with department chief's approval", "department director's 100-copy printing", and the like. Such names are assigned to workflows, which have already been defined as sequences of activities defined by the activity management unit 107. For example, a workflow named "case binding printing with department chief's approval" includes a series of defined activities which are set in the order of "document reception by a person in charge A", "layout by person in charge B", "approval by an administrator C", "double-sided printing", and "case binding". Each activity is designated using its ID. The activity management module 107 also holds, for example, a table or the like, which associates activity information including the IDs of devices and programs that serve as execution subjects of activities, their locations (addresses), and the like, and activity IDs. Upon execution of a workflow, the workflow execution module 104 reads each activity ID from the workflow information, and refers to the corresponding activity information. The workflow execution module 104 generates a job ticket based on the activity information which is referred to. The job ticket describes a device name and the like having the ID included in the activity information, thus specifying a processing subject.

<Workflow>

Figure 2:
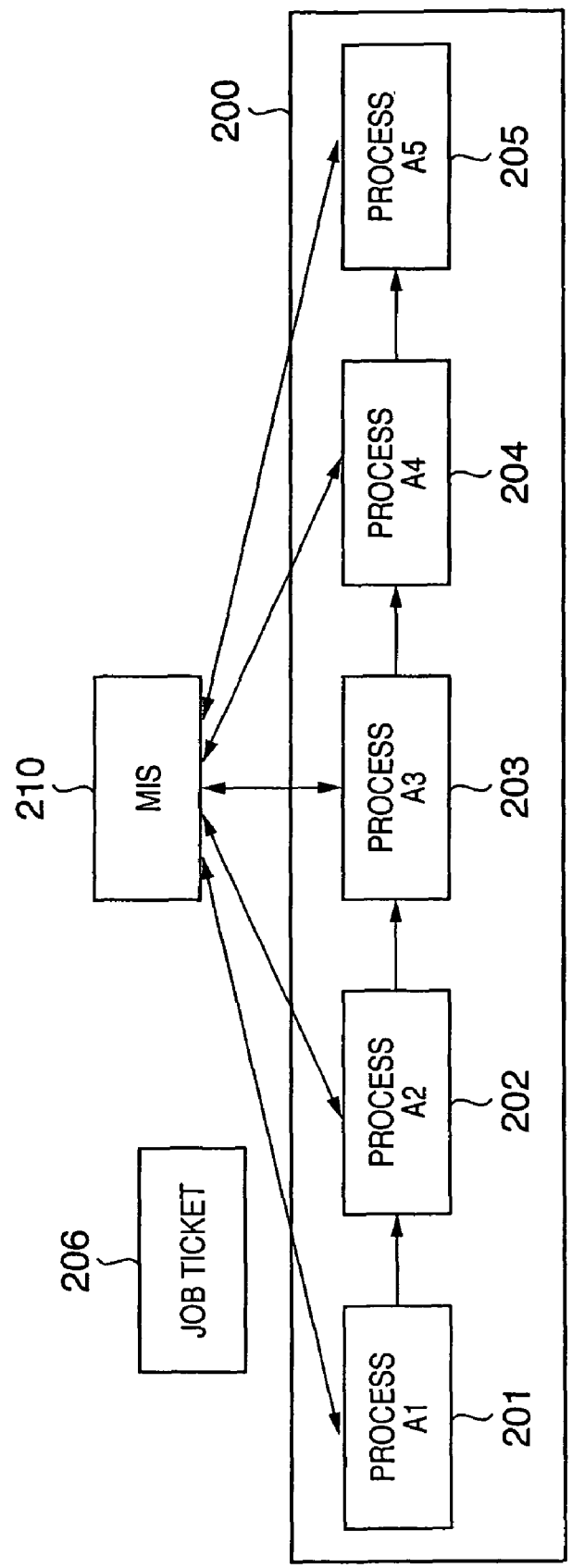
FIG. 2 is a chart showing a definition example of a workflow.

FIG. 2 shows a definition example of a workflow. Referring to FIG. 2, a workflow 200 includes activities 201 to 205, which are set in series. The activity (process) 201 launches the document reception application. In the workflow information, this activity is defined as, e.g., "document reception by person in charge A". This definition may be described using a natural language like in this example, or it may be defined using specifically determined given rules. For example, the definition may be described like "operation name"+"by"+ "subject name". When the printing system can select an appropriate execution subject, the description of the subject may be omitted. In any case, the activity is described in a format which can be interpreted by the workflow execution module 104 implemented by the computer, and can specify the subject (execution subject) of the activity. Upon completion of the activity 201, the control advances to the activity 202. The activity 202 launches the layout application. For example, this activity is described like "layout by person in charge B". Likewise, the activity 203 prints data on print sheets. For example, this activity is described like "double-sided printing". In this example, since the printing system (e.g., the workflow execution module) can appropriately select the printer having the double-sided printing function, there is no description of the subject. Upon generating a job ticket based on the workflow information, an apparatus serving as a subject is selected. The activity 204 executes finishing using the near-line finisher. For example, this activity is described as "case binding". The activity 205 makes the administrator or the like confirm the output result contents. For example, this activity is described like "approval by administrator C".

In this way, one workflow is formed by joining the activities 201 to 205. The workflow information can be realized as a data file obtained by arranging activity names (or IDs: A1, . . . , A5 in FIG. 2) in the execution order. The activity management module 107 stores definition information that defines an entity of an activity. The job ticket 206 has a configuration, the details of which will be explained using FIG. 3. For example, a job ticket 206 is generated based on the workflow 200. The job ticket may be generated based on information ordered from a customer. An MIS (management server) 210 transmits the job ticket to execution subjects of respective processes. Also, each device returns the job ticket to the MIS 210 upon completion of the corresponding process. If any abnormality such as out of paper or the like has occurred in, e.g., the activity 203 in FIG. 2 during the workflow, print job data is divided into a part which has been processed by that activity and a part that cannot be processed, and the job ticket is divided in correspondence with the divided print jobs. The workflow progresses for respective divided parts, and are combined again. The contents of the job ticket will be described below.

<Job Ticket>

Figure 3:
FIG. 3 shows a configuration example of a job ticket.

FIG. 3 shows a configuration example of the job ticket. FIG. 3 shows an example of the job ticket before execution of the workflow. Reference numeral 301 denotes a start symbol of the job ticket; and 302, a source job name. The job name is desirably associated with a workflow name as its basis. In this example, the source job name is "361212". Reference numeral 303 denotes a job name. Client information 304 is "kazuta", payer information 305 is "matsueda", a destination 306 is "xxxxxx-yyyyyy", and a server name 307 is "stargate". For example, when the user inputs these values upon generation of a workflow, the values included in the workflow information can be used upon generation of a job ticket. The server name is that of the server 100. A state date & time 308 indicates the generation date and time of this job ticket. Processes 309 to 313 indicate work processes to be executed in correspondence with the activities. The process 309 indicates the contents of the activity 201. Likewise, the process 310 indicates the work contents of the activity 202; the process 311, those of the activity 203; the process 312, those of the activity 204; and the process 313, those of the activity 205. A mark 314 is an end mark of the job ticket.

The activity management module 107 stores the contents of the activities. Upon generation of the job ticket, the processing contents are described in the job ticket according to the contents corresponding to the activities with reference to the activity management module 107. The activity management module 107 describes the activities "document reception by person in charge A", "layout by double-sided case binding by person in charge B", "approval by administrator C", "double-sided printing", and "case binding" in correspondence with activities A1 to A5 in this example. Hence, the workflow execution module 104 or job ticket generation module 103 converts the contents of the respective activities into parameters required to execute them, and describes the parameters in the job ticket. The parameters include, for example, device identifiers and addresses, the types of processing, parameters required for that processing, and the like. For example, for the activity "document reception by person in charge A", the identification name and address of the computer on which the document reception application runs, process A1 of the job ticket describes the contents of the activity to be presented to the operator, and the like. For the activity "case binding", process A4 of the job ticket describes the identifier and address of the finisher which is used to execute that activity, the type of finishing processing, and parameters required according to the processing.

<Overview of Workflow Execution>

Figure 4:
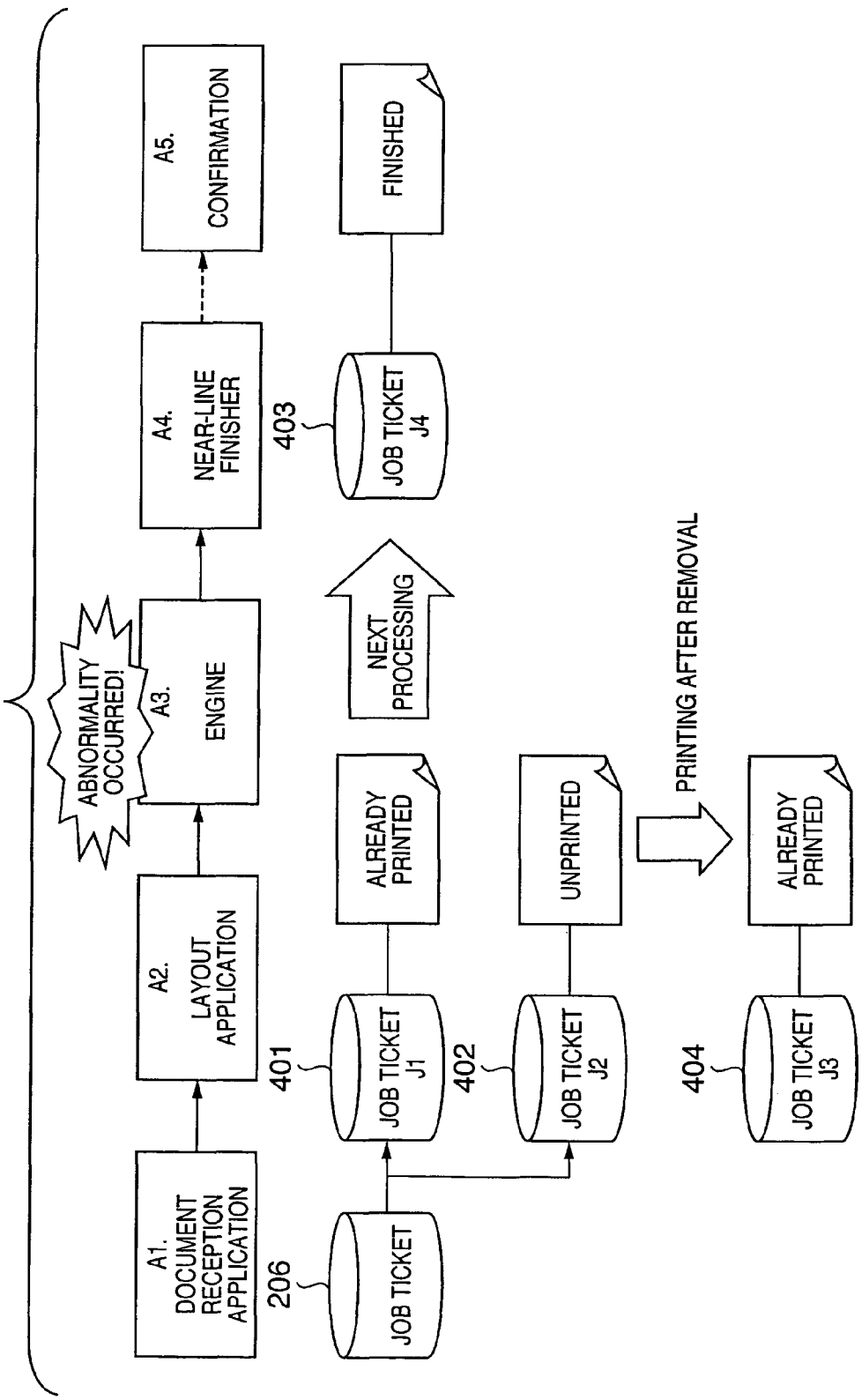
FIG. 4 is a schematic system chart of a system upon using the present invention.

FIG. 4 shows an example of the workflow execution sequence in this embodiment. An example of the normal workflow execution sequence will be explained first. The workflow execution module 104 (or the job ticket generation module 103) reads the designated workflow from the workflow management module 108, and generates a job ticket corresponding to the workflow. In this case, the workflow execution module 104 appends required information to the processes corresponding to activities included in the job ticket. The workflow execution module 104 outputs the job ticket to devices that execute the corresponding processes. Since the job ticket describes information (parameters) required to execute the processing step of interest, each device reads the corresponding part of the job ticket, and executes the process according to the described parameters. The corresponding part can be detected by collating the device identifier held by the device that received the job ticket with the device ID described in each process of the job ticket. More specifically, the workflow execution module 104 sends the job ticket to the devices which execute the activities of the workflow in the order defined in the workflow. In this way, the devices execute the activities in the order defined in the workflow. That is, the workflow execution module 104 or job ticket generation module 103 converts the contents of respective activities into parameters (device identifiers, processing types, processing parameters, and the like), and describes the parameters in the job ticket. Note that parameters such as a paper size and the like for the processing may often be determined based on the processing result of the immediately preceding activity, e.g., that of the layout application 110.

For example, if the activity of interest is document reception, the workflow execution module 104 transmits the job ticket that describes the document reception process to the computer in which the document reception application is installed as the execution device of that process. When the document reception processing is executed according to operations by the operator, the job ticket describes, as its contents, the identifier of the device that executes the processing, and an instruction for the operator. Upon reception of this job ticket, the job ticket processing program (described above) of the computer reads information described in correspondence with the processing step of interest, and displays, e.g., the operator name, processing contents (for example, "document reception by person in charge A"), and described information. When the person in charge logs in, the program authenticates him or her, and permits the person in charge of document reception to perform the document reception operation. For example, this authentication can be implemented by searching for a directory server (not shown) or the like for, e.g., the person in charge identification name described in the job ticket, and collating them. After that, the person in charge designates data which is to undergo document reception, and the document reception application completes processing such as conversion into a predetermined format and the like. The converted data is stored in a folder (e.g., a hot folder) designated in advance. Finally, the computer in which the document reception application is installed additionally describes the contents which are settled after the processing such as the input file name, the name of the hot folder (including its location as needed), the size, the processing start time and end time, and the like in the job ticket. If there is information designated by the operator, the computer also additionally describes it. For example, since the operator may designate the number of print copies in this stage, the computer writes it in the job ticket. Finally, the computer in which the document reception application is installed transmits the updated job ticket to the workflow execution module 104.

The aforementioned processing is similarly done for that which requires operator's intervention. As for processing that can be executed without operator's intervention, the job ticket describes parameters suited to a device that executes the activity of interest. For example, in case of the activity "double-sided printing", the workflow execution module 104 determines a device which executes that activity, writes print settings such as a paper size, double-sided printing mode, and the like in the job ticket, and transmits that job ticket to the print engine 111. This format may comply with the standard such as JDF (Job Description Format) or the like. Other points are the same as those in the processing that requires operator's intervention. For example, as for a device which processes the activity "double-sided printing", the workflow execution module 104 specifies the device which can execute double-sided printing from device information managed in the server 100. The workflow execution module 104 generates a job ticket that describes the contents to be processed by that device.

However, in some kinds of processing, parameters may be given in accordance with processing to be executed later. For example, the layout in the layout application is done according to the print order and the type of finishing processing (especially, bookbinding processing). For example, the bookbinding processing executes processing for folding a predetermined number of printed sheets into two, bundling them by stapling, putting the back cover on the bundle, and so forth. For this reason, the page layout by the layout processing is determined depending on the number of sheets to be folded into two, the folding direction, and the like. Also, the way of processing is restricted by the functions of the apparatus. Hence, the workflow execution module 104 or job ticket generation unit 103 determines a job ticket required to execute the activity of interest based on the entire workflow and functions of the device to be used.

<Derivation of Workflow>

Figure 5:
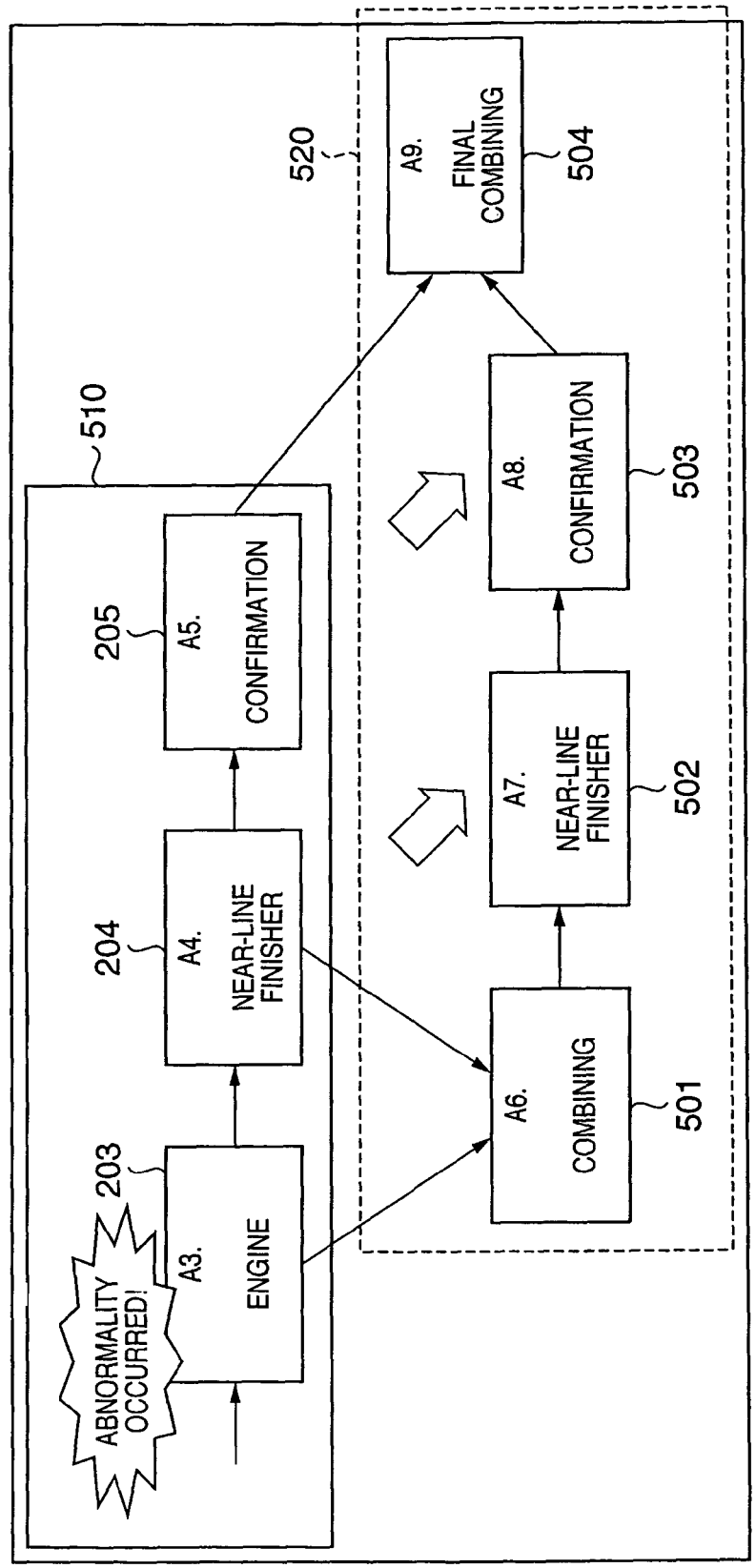
FIG. 5 is a schematic chart showing workflow automatic generation of the present invention.

FIG. 5 is a schematic chart showing workflow automatic generation (i.e., derivation) according to the present invention. Activities 203 to 205 are the same as those in FIG. 2. A workflow 520 is a derivative workflow which is derived to have a workflow 510 as an original workflow. Activities 501 to 504 are those which belong to the derivative workflow 520 which is generated by the automatic generation processing of the derivative workflow. In this example, when an abnormality has occurred in the activity 203 of the original workflow 510, the derivative workflow 520 is generated. The workflow 520 is executed for a part (unprocessed data of the activity 203) of a job which was interrupted during processing of the activity 203, after removal of the abnormality. A partial job (printed materials) which has been processed by the activity (print processing by the print engine) 203 advances to the activity 204 without waiting for removal of the abnormality in the activity 203.

The activity 501 of the derivative workflow 520 is a combining activity. This activity combines a job after removal of the abnormality from the activity 203, and a part of a job which cannot be processed by the activity 204. The combining activity can be generated as needed upon generation of the derivative workflow. The activity 502 can handle a job processed by the copied activity 501 of the activity 204. The activity 503 is a copied activity of the activity. 205, and can handle a job which has been processed by the activity 502.

Note that a confirmation activity is processing for making the user confirm the output product. For example, the confirmation activity is software, which displays details (the number of copies, the number of pages per copy, size, and the like) of the output product whose processing is complete on a computer terminal. The user (person in charge of confirmation) collates the displayed data with information obtained by checking actual printed materials and inputs a message indicating a match or difference at that terminal. As a result, if the user confirms a match, the workflow execution module is notified of that message, and advances to the next activity.

The activity 504 is a finally combining activity. That is, the workflow execution module 104 can generate a combining process for combining the output data from the final process of the workflow (workflow 510) stored in the storage means and the output data from the final process of the newly generated workflow 520. Therefore, the workflow execution module 104 can generate a workflow that combines the output data from the final process of the workflow 510 and that from the final process of the new workflow 520. In this example, the output from the activity 205 is combined with that from the activity 503.

For example, when objects to be combined are data, the combining activity reconstructs single combined data by combining them. On the other hand, when objects to be combined are physical ones, and are to be combined by user's manual processing, the combining activity combines, e.g., parameters to be passed to the next activity. Since the activity 504 is that in the final stage, it may execute the same processing as the confirmation activity that makes the user confirm details of the combined output product. However, the activity 501 combines the output parameters from a partial job which branches from the activity 203 to the workflow 520, and those of a partial job which branches from the activity 204 to the workflow 520. The combined parameters are input to the next activity 502.

For example, a case will be examined below wherein 10 copies of printed materials for 20 pages are to be printed and bound. Assume that there are 50 pages of printed materials which cannot be printed due to an error in the activity 203. If print processing is done in copy units, 10 pages as a half of one copy which is printing upon occurrence of the error are printed, and the remaining half is not printed. For this reason, if the activity 204 is bookbinding processing, it cannot apply the bookbinding processing since printed materials for 10 pages are odd. The printed materials which are left in the activity 204 are combined with those (50 pages) which cannot be printed due to the error in the activity 203 and are printed after removal of the error. The activity 501 combines the printed matters. The operator often manually makes processing for stacking and setting the printed materials on the finisher. In this case as well, the parameters to be input to the finisher must be combined.

That is, the activities 203 and 204 respectively divide jobs, and one of the divided jobs advances to the next activity. In each activity, the other divided job is input to the activity 501. In this case, the parameters of the job from the activity 203 indicate that the number of pages to be processed is 50, and the number of pages per copy is 20. On the other hand, the parameters from the activity 204 indicate that the number of pages to be processed is 10, and the number of pages per copy is 20. Therefore, the combining activity adds the numbers of pages to 60. This is a parameter to be input to the activity 502 as the finishing processing. The activity 502 binds the printed materials of 60 pages every 20 pages.

Note that the derivative workflow 520 in FIG. 5 may not include the combining activity, and data and parameters that have undergone the combining processing may be input to the derivative activity.

In this example, an entity of the combining activity is a program defined with processing for combining the parameters output from the immediately preceding two (or more) activities to the workflow execution module 104 into one. More specifically, combining the parameters into one is addition or the like. The workflow execution module 104 passes the parameters to be added to the combining activity inserted at the head of the workflow. The combining activity adds the designated parameters, and outputs the sum parameters. The parameters to be added include the numbers of pages, the numbers of copies, and the like. The workflow execution module 104 holds, in advance, a combining table that defines parameters to be added by the combining activity in accordance with the immediately preceding activity. The workflow execution module 104 designates parameters, which are determined with reference to the activity immediately before the appended combining activity and the combining table, as those to be added. For example, "the number of pages" is registered in the combining table in correspondence with the print activity. In this case, if the activity immediately before the combining activity is "print", "the number of pages" can be specified from the combining table as a parameter to be added. This parameter is designated for the combining activity. The combining activity which receives the designated parameter adds the corresponding value to the designated parameter "the number of pages" of those input from a plurality of activities. Of course, the number of designated parameters is not always one. A plurality of parameters such as "the number of pages", "the number of copies", and the like may be designated.

The confirmation activity is also similarly defined in advance. However, an entity of the confirmation activity is a program which displays input parameters on a terminal, and prompts the operator to input a confirmation message.

<Setting of Property of Activity>

Figure 6:
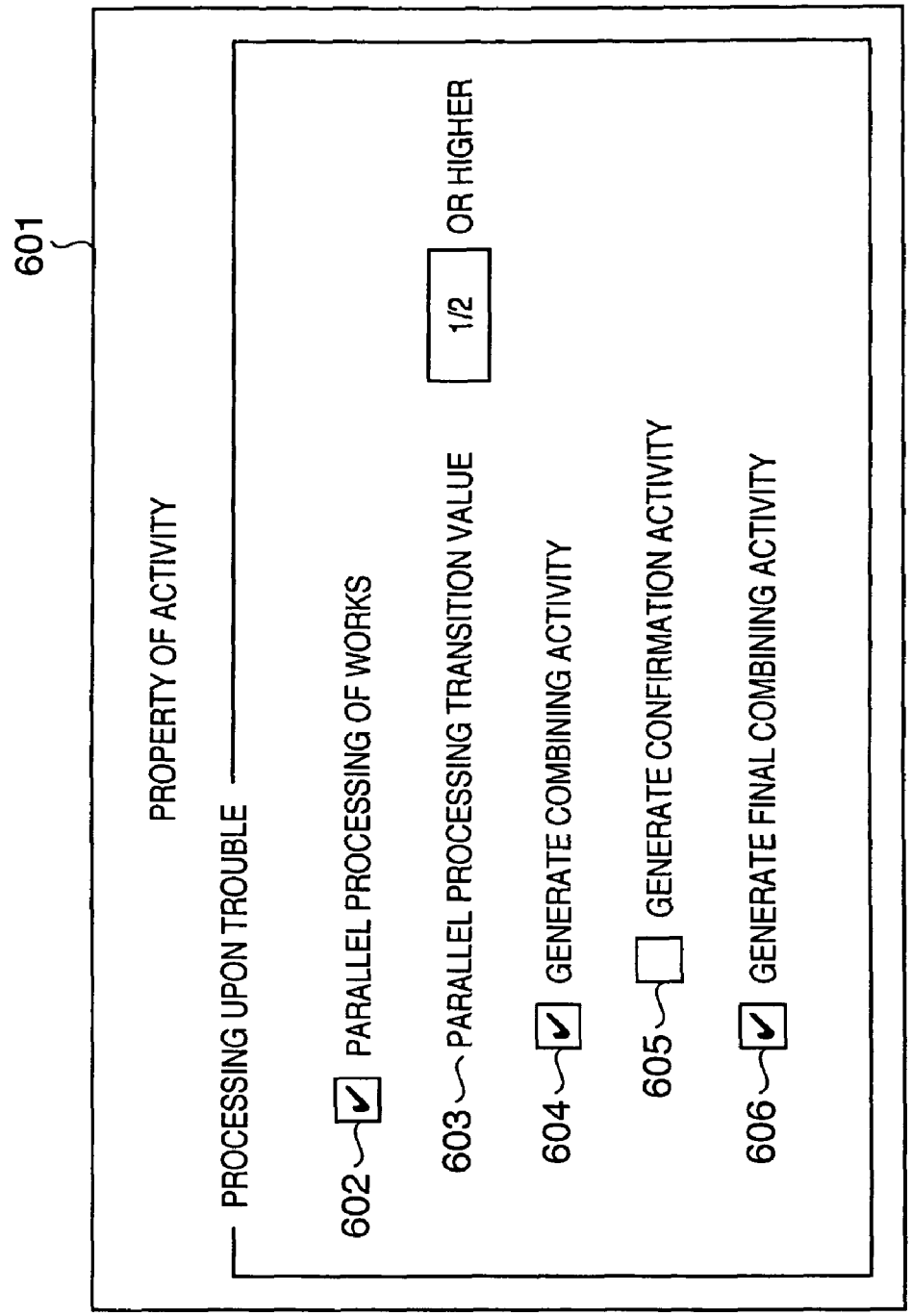
FIG. 6 shows a setting display example of the property of an activity.

FIG. 6 shows a setting display example of the property of the activity. Generally, a workflow system can set the property for each activity. For example, the system can set independent properties for the activities 201 to 205 shown in FIG. 2. The property allows to set various parameters, and this example shows only some of them. The activity management module 107 executes the property settings of the activity. To attain the property settings, the user inputs an activity ID on a user interface dialog provided by the activity management module 107, thus reading the current property. If no ID exists, a new ID may be created. The property is stored in a storage unit such as a hard disk or the like in association with the contents (e.g., a description "printer A executes double-sided printing for 10 copies") stored as the activity. The user interface dialog displays the readout property, as shown in FIG. 6. The presence/absence of checking in each check box in FIG. 6 is stored as, e.g., a flag in the property. In the following description, the presence/absence of checking in the check box is checked. However, in practice, the flag which belongs to the property is to be checked.

Referring to FIG. 6, a display frame 601 corresponds to a dialog setting area. A check box 602 is used to select processing as to whether or not parallel processing of works is to be executed upon occurrence of a trouble. This dialog box is currently checked to set to execute the parallel processing of works. When it is set to execute the parallel processing, a new derivative workflow including a workflow after the activity in which a trouble has occurred is generated upon occurrence of the trouble. That is, when the workflow execution module 104 determines that the received processing status matches the workflow generation conditions, it generates a workflow which includes a processing step of interest, which is assigned to a device as a source of the processing status, and processes after the processing step of interest. For this purpose, the workflow execution module 104 generates a new workflow using information corresponding to the processing step of interest and the processes after the processing step of interest in the stored original workflow information (corresponding to the workflow 510 in FIG. 5). Then, a job is divided into a part which is processed intact according to the original workflow, and a part which is processed according to the derivative workflow. On the other hand, if the check box 602 is not checked, when a trouble has occurred in a given activity, the entire job halts in that activity until the trouble is removed.

A box 603 is an input field of a parallel processing transition value. The parallel processing transition value is a threshold used to determine whether or not a derivative workflow is generated upon occurrence of a trouble in the activity of interest. This threshold indicates a processing completion ratio of data to be processed by a job. In FIG. 6, the current setting is 1/2. Assuming the property in FIG. 6 represents the settings of the activity 203, if any abnormality of the engine occurs after the engine of the activity 203 has done the output 1/2 or more the entire job, the settings of setting values 604 to 606 are enabled. This check box (also called a switch) 603 can receive an entry of a significant setting value in terms of the workflow.

A check box 604 indicates the presence/absence of generation of a combining activity. If the check box 604 is checked, a combining activity is generated at the head of the derivative workflow. In the example of FIG. 5, the activity 501 corresponds to the combining activity. A check box 605 is used to set the generation processing of a confirmation activity. The confirmation activity makes the user confirm the parameters and the like of a job to be processed by that activity. If the check box 605 is checked, the confirmation activity is inserted immediately after the combining activity generated according to the check box 604. When the inputs a confirmation message on the screen, the confirmation activity ends. As a result, the user can confirm on the screen of a computer terminal if jobs are combined. To permit an authorized person to make confirmation, authentication information may be requested on the screen.

A check box 606 is used to generate a final combining activity. If this check box 606 is checked, a combining activity that combines the original workflow and derivative workflow into one is generated. Since the check box 606 is ON, the combining activity 504 is appended in FIG. 5.

Note that the activity is appended by, e.g., the following method. The combining activity and confirmation activity to be appended in the generation processing of the derivative workflow are defined in advance, and are stored in a storage unit of the server 100 (or another computer) in an executable format. In the workflow information of the derivative workflow copied from that of the original workflow, information such as the IDs of the activities and the like are inserted at appropriate positions. The ID is associated with the entity of the activity. The workflow execution module reads that ID to execute a program as the entity of the activity associated with the ID.

That is, the workflow execution module 104 sets the conditions for generating a workflow using the values set via FIG. 6. The workflow execution module 104 checks in checking processing to be described later if the processing status received from the processing step of interest matches the set conditions. If the processing status matches the values set in FIG. 6, the workflow execution module 104 generates a new workflow.

<Flow Example Without Using Present Invention>

Figure 7:
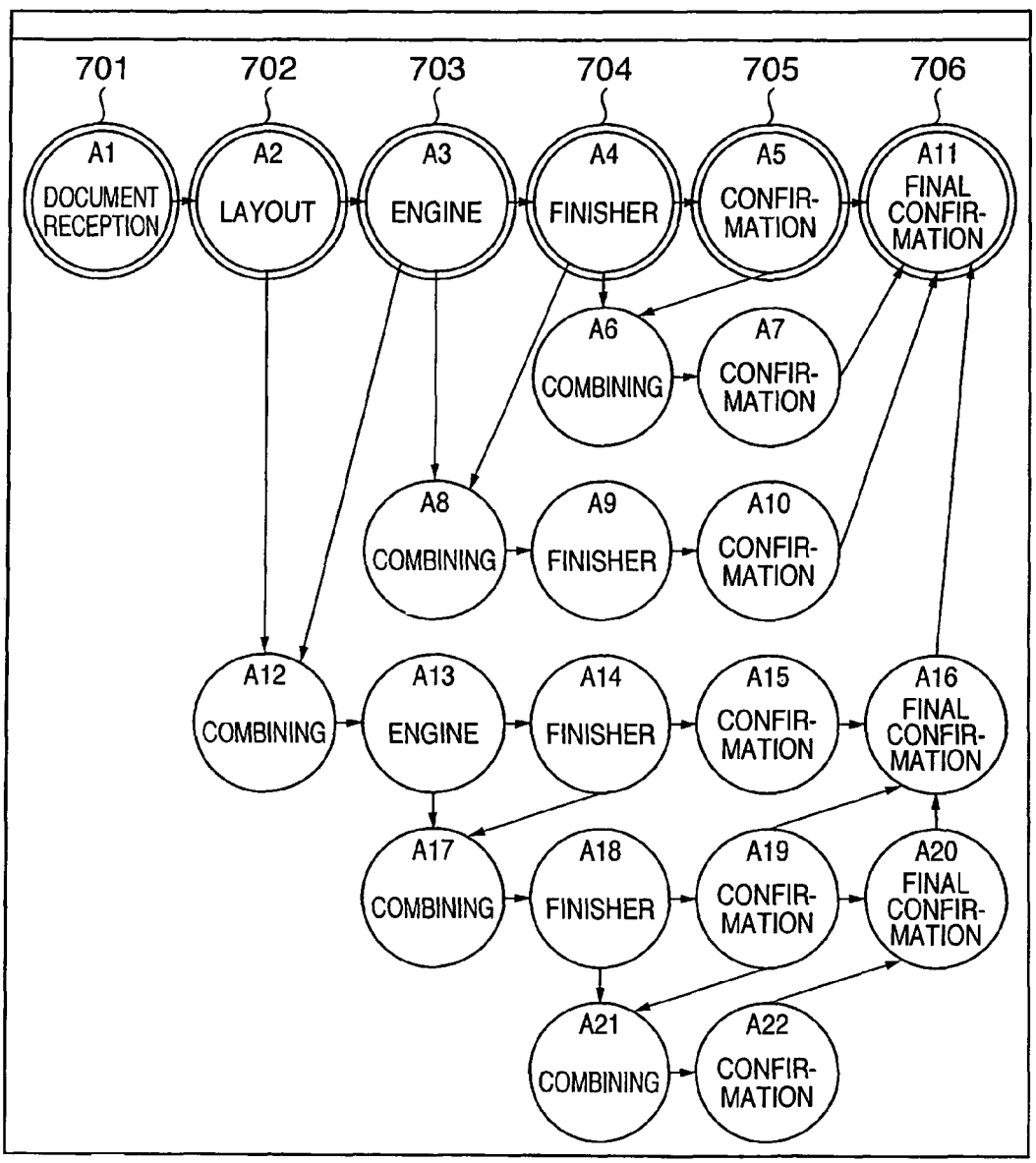
FIG. 7 is a chart showing a flow example without using the present invention.

FIG. 7 shows a flow example when the present invention is not used, i.e., when branches of jobs are statically defined in advance. When the workflow halts due to, e.g., an error in a given activity, a complicated flow shown in FIG. 7 is obtained upon configuring a flow which advances only a possible part so as to shorten the processing time. For example, when a workflow is interrupted in an activity 703 (printing by an engine), a branched flow including a series of activities starting from an activity A8 must also be defined so as to process data which are divided into processed and unprocessed data before and after the interruption. The same applies to other activities. FIG. 7 does not cover all branches, and another branch may run from a branch destination. For this reason, in order to cover all branches, a further complicated flow is required. That is, if a workflow that can cover all errors is prepared to assume errors that may occur in respective activities, a huge workflow must be held. If one forgets to prepare some branches, when an error occurs, the processing can no longer be covered. In this way, it is very difficult to prepare a workflow that covers all errors assuming errors that may occur in respective activities.

<Derivation Processing of Workflow in this Embodiment>

By contrast, in this embodiment, the original workflow includes only activities indicated by double circles. That is, since branches are dynamically derived as a new workflow, the original workflow need only define a primary flow, thus improving the work efficiency of workflow generation.

Figure 8:
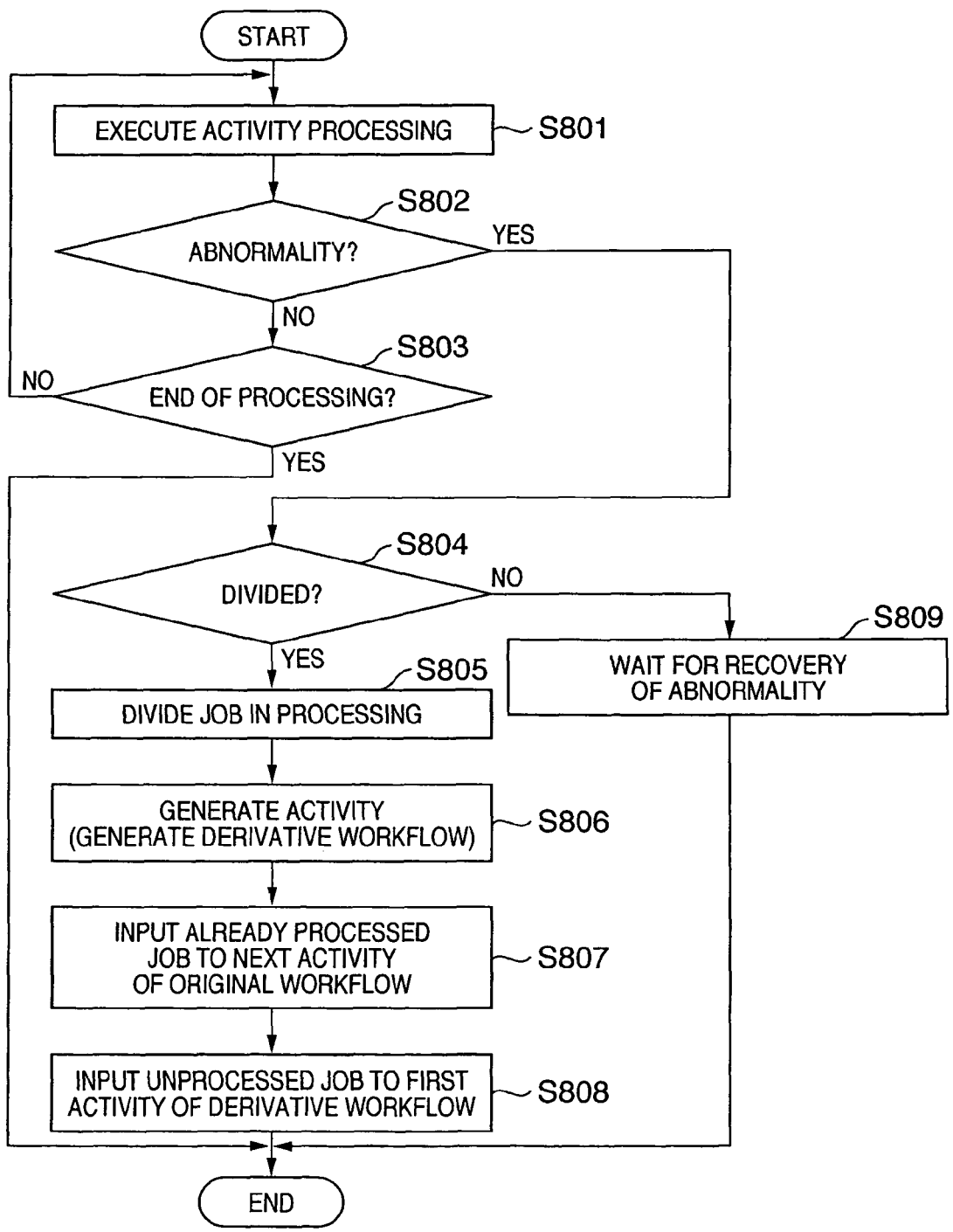
FIG. 8 is a control flowchart upon executing an activity.

FIG. 8 is a control flowchart when the workflow execution module 104 executes one activity. The following description will be given with reference to FIG. 8. In step S801, processing of an activity is executed. Execution of the activity is prosecuted by transmitting a job ticket (to be described later) to a device or program as an execution subject of the activity. Note that the CPU of the information processing apparatus executes the workflow of the present application. The information processing apparatus generates a workflow which defines a processing order of a plurality of processes, and has a storage unit which stores the workflow and workflow information which defines processing in respective processes included in the workflow.

In step S802, the workflow execution module 104 checks if an abnormality has occurred during the processing in the activity. The occurrence of the abnormality is detected when the workflow execution module 104 receives a message indicating occurrence of the abnormality from the device or program as the execution subject of the activity. That is, the workflow execution module 104 receives the processing status of a processing step of interest of a plurality of processes defined in the workflow from the device that executes processing of the processing step of interest. If no abnormality is detected, the control advances to step S803. The workflow execution module 104 checks in step S803 if the activity processing is complete. Completion of the activity can also be determined from an end message from the device or program. If it is determined in step S803 that the processing is complete, this processing ends; if the next activity exists, the control advances to that activity. If it is determined in step S803 that the processing is not complete yet, the control returns to step S801.

On the other hand, if the workflow execution module 104 determines in step S802 that an abnormality has occurred, the control advances to step S804. The workflow execution module 104 checks in step S804 if a derivative workflow is to be generated, i.e., if the job ticket is to be divided. More specifically, the workflow execution module 104 checks the contents set on the dialog 601 in FIG. 6 to see if a derivative workflow and a new activity included in that derivative workflow are to be generated. That is, if the "parallel processing flag of works" is set, and the ratio of the processing amount that has already been done to that to be done yet is equal to or larger than the "parallel processing transition value", a derivative workflow is generated. The processing amount is expressed by, e.g., the number of output pages. That is, the workflow execution module 104 checks in step S804 if the received processing status of the processing step of interest matches the workflow generation conditions. If it is determined in step S804 that the processing status of the processing step of interest matches the workflow generation conditions, the workflow execution module 104 generates a new workflow based on the stored workflow information and the processing status of the processing step of interest in step S805.

In this way, if the workflow execution module 104 determines that a derivative workflow is to be generated, the control advances to step S805. In step S805, the workflow execution module 104 receives interrupt information indicating occurrence of interruption from the device which executes the processing in the activity that has suffered the abnormality, and recognizes a position at which the job is to be divided.

In step S806, the workflow execution module 104 generates a derivative workflow in accordance with the property of each activity shown in FIG. 6. That is, the workflow execution module 104 copies the workflow information of the original workflow to include the activity which has been interrupted due to an error. The workflow execution module 104 appends combining activities at the head and end of the workflow, and also a confirmation activity with reference to the property of the interrupted activity. In the example of FIG. 5, the workflow execution module 104 generates workflow information including the activities 501 to 504. In step S807, the workflow execution module 104 divides the interrupted job into an processed part and unprocessed part based on the information acquired in step S805. More specifically, the workflow execution module 104 divides the job ticket input to the interrupted activity into an unprocessed part and processed part. The workflow execution module 104 transmits the job ticket of the processed part to a program or device as an execution subject of the next activity in the original workflow.

In step S808, the workflow execution module 104 inputs the information associated with the unprocessed part to an execution subject of the activity at the head of the derivative workflow. That is, in the example of FIG. 5, since the combining activity is located at the head of the derivative workflow, the workflow execution module 104 inputs the job ticket of the unprocessed part to a program that executes the combining activity. Details of this program will be described later using FIG. 9.

If it is determined in step S804 that a new workflow is not generated, the control advances to step S809 without generating any derivative workflow, and the workflow execution module 104 waits for recovery in the activity that has suffered the abnormality for the entire job.

<Example of Processing of Workflow Execution Module 104>

The processing procedure of the workflow execution module 104 will be described in more detail below with reference to FIG. 9 taking the print process as an example. The procedure of FIG. 9 starts from the start time of the process 203. Of course, the same applies to other processes. Note that "all printed?" checking steps S1313 and S1309 in FIG. 9 should be replaced by those which check if the processing in each process is complete. Also, the checking processing in steps S1302 and S1303 is made based on different references for respective processes.

Figure 9:
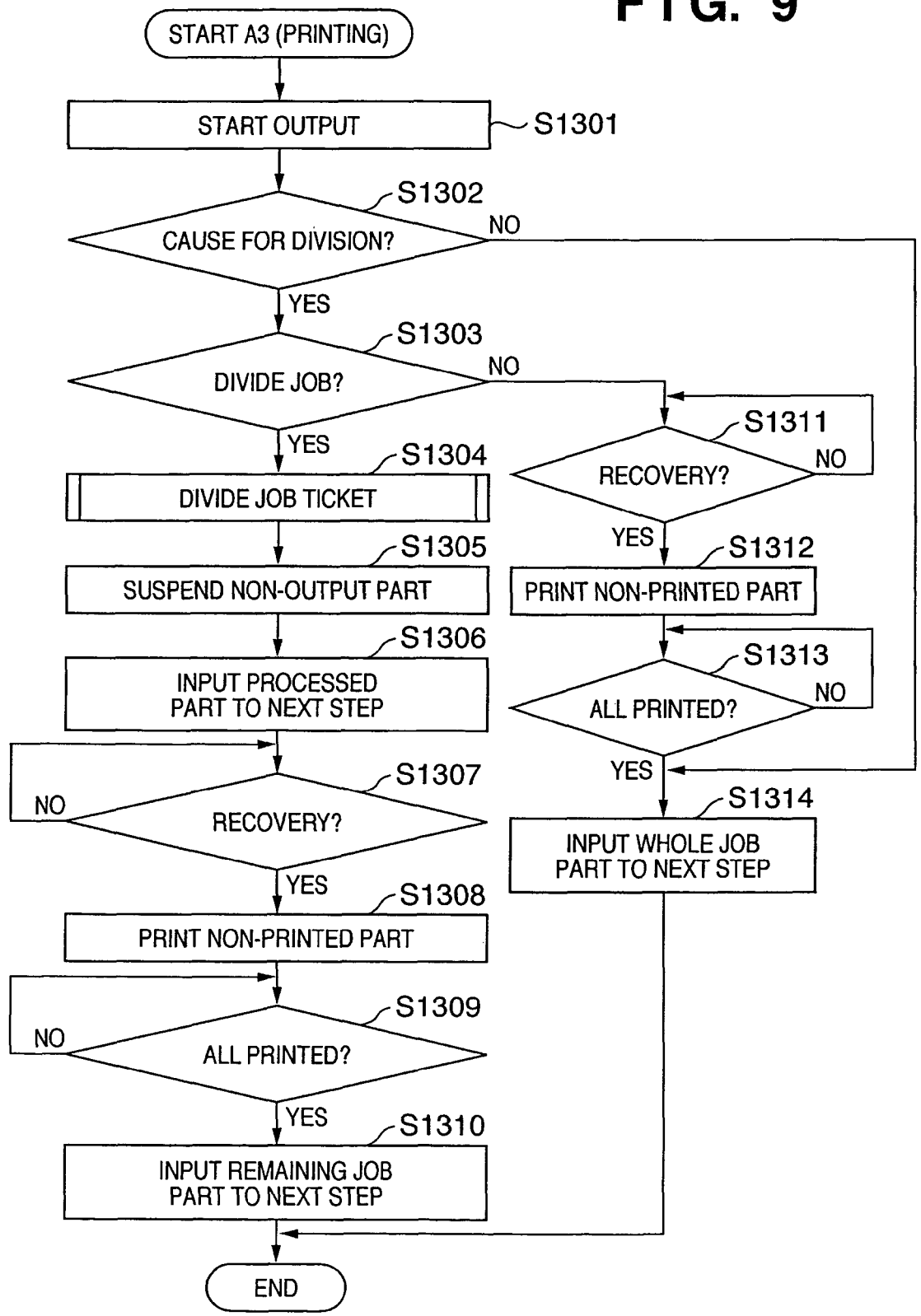
FIG. 9 is a flowchart showing a processing example of a workflow execution unit.

Referring to FIG. 9, in step S1301 the workflow execution module 104 requests the print engine 111 to output data. More specifically, the workflow execution module 104 generates a job ticket 401 in FIG. 10 except for a description of processing results 504 to 506 in process A3, and transmits it to the print engine 111 in step S1301. Of course, an instruction to the print engine 111 is described based on the processing result in the previous process A3. For example, in the process A2, the output size is A3, the number of pages is 120, and data are laid out on two faces. Hence, the workflow execution module reads items included in the processing result of the process A2 of parameters required for printing, and writes them as parameters of the process A3 in the job ticket. Note that the MIS 210 may pass print data or the location and file name of the print data may be described as the processing result of the process A3 and the location of the data may be described in the job ticket with reference to that processing result although not shown in FIG. 5.

Upon completion of printing in the print engine 111, the workflow execution module 104 receives the job ticket returned from the print engine 111. The workflow execution module 104 checks in step S1302 if a cause for dividing the job (i.e., a cause for generating a derivative workflow) has occurred. The cause for division is checked for each process during processing (the processing step of interest). Generally speaking, if an event that halts the job during processing has taken place, it is determined that there is a cause for dividing the job, i.e., a cause for generating a derivative workflow. For example, in case of the print process, a problem such as a trouble or the like has occurred in the print engine 111. Note that the processing status of the processing step of interest that matches the conditions for generating a new derivative workflow may also be an event that interrupts the processing of the device. In this case, the workflow execution module 104 generates a new derivative workflow which includes the processing step of interest and the processes after the processing step of interest to have the processing step of interest in which an error has occurred at its head position. On the other hand, in case of the finishing process, it is checked if all pages which form one unit (e.g., one copy) of the finishing processing are obtained. If a part (page) less than one unit of the finishing processing is found, it is determined that there is a cause for dividing that part as an independent job. If it is determined that there is a cause for division (for example, a problem has occurred in the print engine 111), the control advances to step S1303 to check if the job is to be divided. If there is no cause for division, the control jumps to step S1314.

The workflow execution module 104 checks in the checking processing in step S1303 if the job of interest is suited to division when there is a cause for division. That is, the workflow execution module 104 checks if the received processing status of the processing step of interest matches the workflow generation conditions. For example, the workflow execution module 104 attains checking based on the property values in FIG. 6 and the processing result of the job of interest. Furthermore, the workflow execution module 104 checks attributes unique to the activity. Although a description is omitted in FIG. 8, if the cause for division is a trouble of the engine, the workflow execution module 104 checks the advisability of division based on "the number of printed pages", "the ratio of the number of printed pages to the total number of pages", "type of post-process", "type of engine trouble", and the like. For example, in an example of case binding of 10 copies of 12 pages, upon passing the outputs from printing to bookbinding, if the process A3 is normally complete, 120 printed materials are output. However, when printing ends after the first 15 pages are output, if these 15 pages are passed to the bookbinding process, bookbinding for one copy can be done. More specifically, the job can be divided. On the other hand, if only the first nine pages are output, bookbinding cannot be executed using these nine pages. That is, the job cannot be divided. In this manner, the workflow execution module 104 checks in step S1303 in consideration of the current processing result, job contents or workflow contents, and the like if the job must be divided.

Examples of criteria in step S1303 are as follows.

(1) The number of printed pages: Whether or not the processing unit (12 pages in the above example) of the post-process (e.g., the finishing process) for at least one set is obtained is checked. If the processing unit for at least one set is not obtained, the job is not divided. This condition includes not only the number of pages, but also the first and end pages included in the output pages.

(2) The ratio of the number of printed pages: Whether or not the ratio of the number of output pages to the number of pages to be output is equal to or higher than a predetermined ratio is checked. If the ratio is less than the predetermined ratio, the job is not divided. When the ratio can be designated like in a case wherein the next process can start if outputs 10% or more of the total outputs are available, whether or not the outputs at that ratio are completed is checked.

(3) Type of post-process: For example, when the next finishing process is a simultaneous box packing work of all pages, it is nonsense to pass the output to the next process unless all pages are obtained. In this way, whether or not division of the job makes sense is checked based on the type of post-process.

(4) Engine trouble: For example, when the next process is bookbinding, if that bookbinding machine is in trouble, and no substitute machine is available, the process cannot advance even when the job is divided. Therefore, division does not make sense. In this way, whether or not a substitute machine after division is available is checked.

The above criteria are examples of the criteria in the print processing. These criteria are stored in a memory or the like in, e.g., a table format, and are referred to upon checking.

If it is determined that the job is to be divided, the control advances to step S1304. In step S1304, the workflow execution module 104 divides the job ticket of the original job into two job tickets (to be described later) shown in FIGS. 10 and 11. In step S1305, the workflow execution module 104 sets the job of the non-output part in a suspended state, so that the job can start immediately after recovery of the engine. That is, the workflow execution module 104 stores the divided job ticket corresponding to the non-output part in the job ticket management module 105 and waits for recovery of the engine. In step S1306, the workflow execution module 104 receives the job ticket from the print engine 111 after completion of the processing of the job corresponding to the already printed part of the divided jobs, and generates a job ticket 403 for the next process A4. The workflow execution module 104 transmits the job ticket 403 for the next process A4 to the execution subject of the process A4 (e.g., finisher 112). In this way, the workflow execution module 104 transits the processing to the finishing process. Upon reception of this job ticket, the finisher 112 executes finishing processing according to the parameters described for the process A4. That is, the workflow execution module 104 generates a job ticket corresponding to the processed part in the processing step of interest, and that corresponding to the unprocessed part in the processing step of interest based on the processing status. Note that the job corresponding to the processed part in the processing step of interest is the job ticket 403, and that corresponding to the unprocessed part in the processing step of interest is a job ticket 402 in the example of FIG. 4. The workflow execution module 104 generates the job ticket 403 which includes the processing contents of the process next to the processing step of interest for the processed part of the processing step of interest based on the processing status. Furthermore, the workflow execution module 104 generates the job ticket 402 which includes the contents to be processed in the processing step of interest for the unprocessed part of the processing step of interest. In the present application, a job ticket which describes the contents to be processed in each process is also described as work instruction data.

In step S1307, the workflow execution module waits for a recovery message from the print engine 111. If the engine has recovered, the control advances to step S1308, and the workflow execution module 104 transmits the job ticket 402 suspended in step S1305 to the print engine 111. Note that the status information of the engine is transmitted to the workflow execution module 104. In this way, the suspended print job starts. Note that steps S1307 and S1308 are located immediately after step S1306 for the sake of descriptive convenience, but they may be executed asynchronously with these steps. The workflow execution module 104 checks in step S1309 if the print processing of all pages is complete.

In step S1310, the workflow execution module 104 advances the job whose processing is complete in step S1308 to the finishing process (A4). That is, the workflow execution module 104 receives the job ticket that describes the processing result from the print engine upon completion of printing in step S1308. The workflow execution module 104 generates a job ticket (not shown in FIG. 4) for the finishing process (A4) based on the workflow and the received job ticket. The workflow execution module 104 transmits that job ticket to the finisher 112 which executes the finishing process.

On the other hand, if it is determined that the job is not to be divided, the workflow execution module 104 waits for the removal of a cause that halts the job, e.g., recovery of the engine for the entire original job in step S1311. If the engine has recovered, the control advances to step S1312 to print the non-output part. The print engine 111 may wait for recovery without returning the job ticket to the workflow execution module 104. Alternatively, if a trouble has occurred, the print engine 111 may halt the processing, and may transmit a job ticket which describes the processed part and unprocessed part as the processing result to the workflow execution module 104. In this case, the workflow execution module 104 again transmits a job ticket that instructs the print process to the print engine 111 which has recovered from the trouble. The job ticket to be transmitted has the same contents as that received from the print engine 111. The print engine 111 executes processing of a part corresponding to <non-output job> while skipping pages corresponding to <output page> with reference to the parameters of the process A3 described in the received job ticket.

The workflow execution module 104 checks in step S1313 if the print processing of all pages is complete. Upon completion of printing, the control advances to step S1314 to advance the entire job to the process A4. In this case as well, the workflow execution module 104 generates a job ticket that describes the parameters for the finishing process A4 for the entire job, and transmits it to the finisher 112.

<Job Division Processing>

An example of generation of a derivative workflow, i.e., the execution sequence of job division, will be described below according to FIG. 4. The workflow execution module 104 executes this sequence. In FIG. 4, when a trouble (e.g., out of print paper) has occurred in the print engine 111 upon execution of the workflow, the workflow execution module 104 generates derivative workflow information. The workflow execution module 104 then divides the job ticket 206 into the job tickets 401 and 402, and allocates the job to the original workflow and derivative workflow. In this manner, since one job is divided into a plurality of jobs of different proceedings and the divided jobs are processed by corresponding workflows, the workflow can be prevented from being interrupted, and the process can partially advance to the next activity for the processed part. That is, in this example, the job ticket 403 for the next process is generated based on the job ticket 401, and the process can advance to the next processing.

The job ticket 402 is independent from the job ticket 403 due to division. For this reason, the processing of the job ticket 402 can start irrespective of the progress of the job ticket 403 after recovery of the trouble. A job ticket 404 is the one after execution of the job ticket 403. As will be described later using FIG. 13 and the like, a job ticket used to execute a given activity has different contents before and after processing, since information is added after completion.

<Division of Job Ticket>

FIG. 10 shows an example of the configuration of the job ticket 401 after division. FIG. 11 shows an example of the configuration of the job ticket 402 after division. Note that a job ticket before division, i.e., that which is transmitted from the print engine 111 to the workflow execution module has substantially the same contents as in FIG. 5. However, since the job is the original job itself, the job name is "361212".

FIG. 10 shows a configuration example of the job ticket 401. A job name 1001 is "361212-1-2-3-1/2". This job name indicates that processes 1 and 2 included in "361212" have succeeded, the job was divided into two jobs in process 3, and this job is the former half of these divided jobs. Note that processes 1, 2, and 3 respectively correspond to activities A1, A2, and A3. "-1-2" indicates that processes 1 and 2 have succeeded, and "-3-1/2" indicates that the job is divided into two jobs in process 3, and this job is the former half of these divided jobs. The job name after division of the job ticket is given as "the original job name+the identification numbers (repeated) of successful processes+identification number of a process in which division is executed+the identifier indicating the position of the divided part with respect to the entire job". "The identifier indicating the position of the divided part with respect to the entire job is given in a fraction format having the number of divisions as a denominator and the number indicating the order of the divided part as a numerator.

A work result 1002 describes a work instruction and work result of process 1. The workflow execution module 104 describes the work instruction. A device which executed processing describes the work result. The work result will be described below. An <input file name> field is "aaabbbc-cc.pdf", and a <start time> field describes that document reception started at "Apr. 14, 2005 19:00:01". An <end time> field describes that document reception ended at "Apr. 14, 2005 19:00:03". A <number of copies> field describes 10 copies. The number of copies may be designated by either the job ticket or the operator upon document reception. A <hot folder> field that stores the received data is "folder1". The hot folder is designated for a given purpose, and is a folder which is designated in advance to store the received data in this example. FIG. 10 shows the hot folder name on the PC which performed document reception. An <executant> field describes that "System" is a subject. In this manner, in process 1, information indicating at least the name of the received file and its storage location is added to the job ticket as its processing result. Note that process 1 ended without any problem (trouble) in FIG. 10.

An area 1003 describes the work instruction and work result of process 2 (A2: layout application). The workflow execution module 104 describes the work instruction, but the work instruction is represented by A2 while its details are omitted in FIG. 10. The work instruction is described based on the workflow and the work result of the previous process described in the job ticket. As the contents of the work instruction, "double-sided case binding" and parameters indicating its details are described. Such description is implemented, for example, when the workflow execution module 104 reads the activities of printing and finishing, and describes layout parameters in the job ticket. The layout processing also includes adjustment of a page order for printing and finishing processing to be executed later. For example, the print engine 111 outputs printed pages in the input page order after layout. The finisher fetches the printed output pages placed on a document feeder in an order unique to that finisher and applies finishing processing to them. The printout page order should be determined so that the finisher can correctly execute bookbinding copy by copy, and the page layout after the layout processing is determined in correspondence with that order. Such page order is determined, for example, when the layout application receives, from the workflow execution module, the parameters which are described in the job ticket and include "double-sided case binding", the number of pages as a unit of bookbinding, and the like.

The device which executed processing describes the work result in the job ticket, as shown in FIG. 10. The work result of process 2 will be described below. Process 2 ended without any problem (trouble) as in process 1. As the layout result, layout for case binding using A3 sheets is done in a 1-up format (one received page is laid out per page of a sheet). The area 1003 includes a description indicating that a person in charge "yamanaka" performed the processing of process 2. Also, the area 1003 includes a description indicating that a cover of case binding uses a paper sheet of board 1. Such description is made when layout including the cover is done in the layout processing. The number of copies is 10, and the number of pages to be printed is 120. These values are described as the processing result when the layout application must generate all output pages so as to match the output order upon printing by the print engine with the processing order of the finisher. The example of FIG. 10 indicates that 10 copies of 12-pages case binding results are output and a total of 120 pages are printed. Note that the number of pages per copy may be described together with the number of copies in place of the total number of pages. Although <start time> and <end time> fields have no entries in process 2, they are set as needed. In this manner, in process 2, at least the number of pages after layout is added to the job ticket as its processing result. Of course, other kinds of information are often added, as shown in FIG. 10.

An area 1004 shows the processing result of process 3. A <device name> field 1004 describes a device name "ABCD". An <output page> field 1005 describes "3-1/2" obtained by connecting the identification number "3" of the process indicating that the division was made in process 3, and the identifier "1/2" indicating that the output complete part is a former half part, and the number of printed pages "50". As a <tally password> 1006, an identical password is inserted in the respective job tickets upon viding the job ticket. In this example, since the job ticket was divided in process 3, a tally password is described as an element of process 3. The value of the tally password is "a3$DtGh", but is not particularly limited as long as it has uniqueness. A <non-output job> information field 1006 describes "3-2/2" obtained by connecting the identification number "3" of the process indicating that the division was made in process 3, and the identifier "2/2" indicating that the output complete part is a latter half part, and the number of unprinted pages "70". Fields 1007 and 1008 indicating processes which are not processed yet have no records of the processing results. A field 1009 describes a mark indicating the end of the job, and also the job name after division. In this way, in process 3, at least the device name and the number of output pages are added to the job ticket as its processing result. Of course, if the unprocessed part remains, the number of unprocessed pages is added in addition to the number of output pages.

The job ticket 401 in FIG. 10 is associated with the processed part of process 3. Upon reception of the job ticket which described that the processing is complete up to the middle of process 3 from the print engine 111, the workflow execution module 104 generates the job ticket 403 which describes parameters for the finishing processing of process 4. For example, since the job ticket 403 is to be sent to the finisher, it describes parameters of processing to be executed by the finisher.

FIG. 11 shows a configuration example of the job ticket 402. As can be understood from a job name 1101, this job is a latter half job divided in process 3 ("-3-2/2"). A tally password 1102 describes the same tally password as the password 1006 as in FIG. 10, and a mark 1103 is an end mark of the job. The job ticket 402 has the same contents as in FIG. 10 except for the job name. The job name 1101 is "361212-1-2-3-2/2" according to the aforementioned rules. This job name indicates that processes 1 and 2 included in original job name "361212" have succeeded, the job was divided into two jobs in process 3, and this job is the latter half of these divided jobs. Note that processes 1, 2, and 3 respectively correspond to activities A1, A2, and A3. "-1-2" indicates that processes 1 and 2 have succeeded, and "-3-2/2" indicates that the job is divided into two jobs in process 3, and this job is the latter half of these divided jobs. Since the job ticket 402 in FIG. 11 is sent to the print engine 111 for the print processing of process 3, it need not describe any parameters of the processing to be executed by the finisher.

Figure 12:
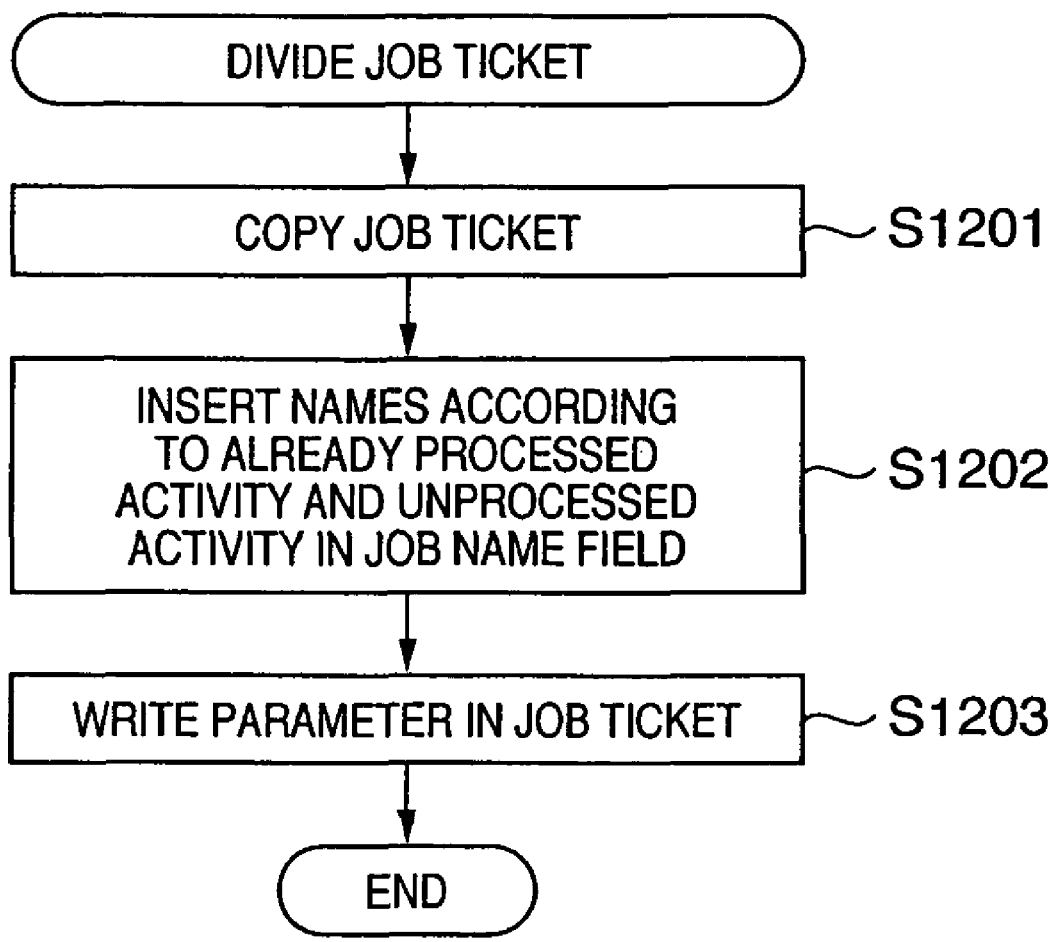
FIG. 12 is a flowchart showing the processing of a job division sequence.

FIG. 12 shows an example of the job ticket division processing. The workflow execution module 104 copies the job ticket of the original job as many as the number of divisions (S1201). The workflow execution module 104 copies the name of the original job to the original job name field of each divided job ticket, and writes a name unique to each job ticket as a job name in accordance with the rules written using FIG. 5 and the like (S1202). After that, the workflow execution module 104 writes an instruction (processing parameters) in a field of a corresponding process for a device which receives the corresponding job ticket (S1203). Note that the parameters described in this field are those which reflect the processing result of the previous process.

<Combine Job Tickets>

The processing of the combining activity that combines job tickets will be described below. The divided jobs can be combined when the processing operations associated with the divided job tickets have reached the same process. If the divided jobs are not combined, the next process often cannot be started.

Figure 13:
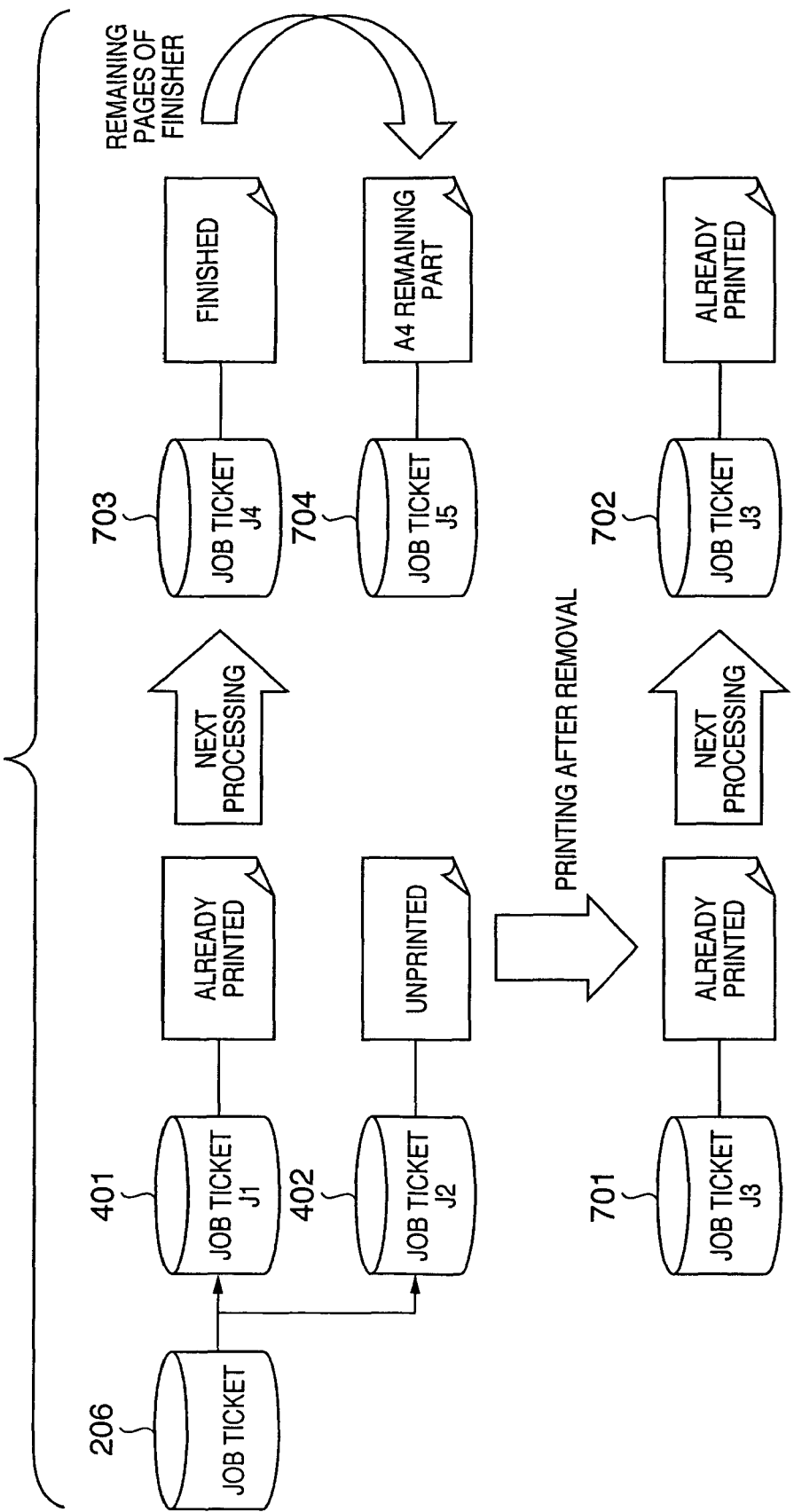
FIG. 13 is a schematic system chart for explaining combining of job tickets.

FIG. 13 is a schematic system chart for explaining combining of job tickets according to the present invention. Referring to FIG. 13, a job ticket 701 is a job and job ticket generated upon completion of printing after recovery of the print engine. A job ticket 702 is that of the job which advances to the next process (finishing), and the next processing has not started yet. In this example, the finishing processing executes case binding having 12 pages per copy for 10 copies.

On the other hand, the job ticket 401 is further divided into two in the next finishing process. This is because finishing processing of process 4 includes bookbinding processing in this example, and can only be executed for only one copy. An odd part less than one copy can undergo bookbinding only when printing of a remaining part is completed, and the odd part is combined with the remaining part. For this reason, the job ticket 401 is divided into a job ticket 703 corresponding to a bound part, and a job ticket 704 corresponding to a non-bound part. For example, according to the description of FIG. 10, the job ticket 401 passes 50 printed pages to the processing of the finisher. Since the finisher executes finishing (bookbinding) every 12 pages, if four copies of books are formed, two pages remain. Hence, the job is divided for 48 pages whose finishing is complete, and 2 pages whose finishing is incomplete. The job ticket 401 is divided into the job ticket 703 corresponding to a finishing process complete part, and the job ticket 704 corresponding to a finishing process incomplete part. The job ticket 704 is combined with the job ticket 702 generated upon completion of printing after recovery of the print engine, and the combined job ticket is issued to the finisher 112 for the finishing processing. The workflow execution module 104 combines these job tickets. In this way, the subsequent process works can be automated, and data can be easily handled.

FIG. 14 shows configuration examples of the job tickets 704 and 702. The description of processes before process A2 is omitted (the same applies to FIGS. 15 and 16). A job ticket 801 shows an example of the contents of the job ticket 704. The job ticket divided in process A4 has an original job name "361212-1-2-3-1/2". Therefore, "361212-1-2-3-1/2-4/2/2" named by appending "-4/2/2" to the original job name according to the aforementioned naming rules is the job name of the job ticket 704. This name indicates that this job is the former half of the divided jobs in process A3, and the latter half of jobs further divided in process A4. Since the value of <non-output job> of process A4 is "4-2/2 2 pages", it is recognized that process A4 of the job indicated by this job ticket is intended to an unprocessed job for two pages.

A job ticket 802 corresponds to a configuration example of the job ticket 702. A job name "361212-1-2-3-2/2" indicates that this job is a latter half job divided in process A3. Since the value of <processed page> of process A4 is "70 pages", it is recognized that process A4 of the job indicated by this job ticket is intended for 70 pages. These values are determined based on the value of the "unprocessed job" field when the finisher 112 reads the corresponding area (the area of the process which describes the finisher as the device name) of the job ticket.

<Combined Job Ticket>

FIG. 15 shows the configuration of a job ticket 901 after the job tickets 702 and 704 are combined. The job tickets 801 and 802 shown in FIG. 14 are transmitted to the workflow execution module 104. In the job ticket 901, SubJobName "361212-1-2-3-2-2" is added after the job name "361212-1-2-3-1/2-4/2/2" to reveal that the jobs are combined. The value of <processing page> of process A4 is "72 pages" as a result of addition. After combining, the control can advance to the processing of the near-line finisher. The numbers of pages to be processed in process A4 in the respective job tickets to be combined are to be added. That is, the value "70" of <processing page> of process A4 of the job ticket "361212-1-2-3-2/2" and the value "2" of <non-output job> of process A4 of "361212-1-2-3-1/2-4/2/2" are added. The combining conditions will be described later.

FIG. 16 shows an example of a job ticket after the finisher received the combined job ticket 901 and executed the finishing processing. This job ticket 1701 is transmitted to the workflow execution module 104. A field 1702 of the job ticket describes the processing result of the processing of process A4. Compared to the job ticket (FIG. 15) before processing, the finisher 112 describes the result such as the number of processed pages, the number of copies, operator, and work contents in the field 1702.

<Combining Activity Processing in This Embodiment>

Figure 17:
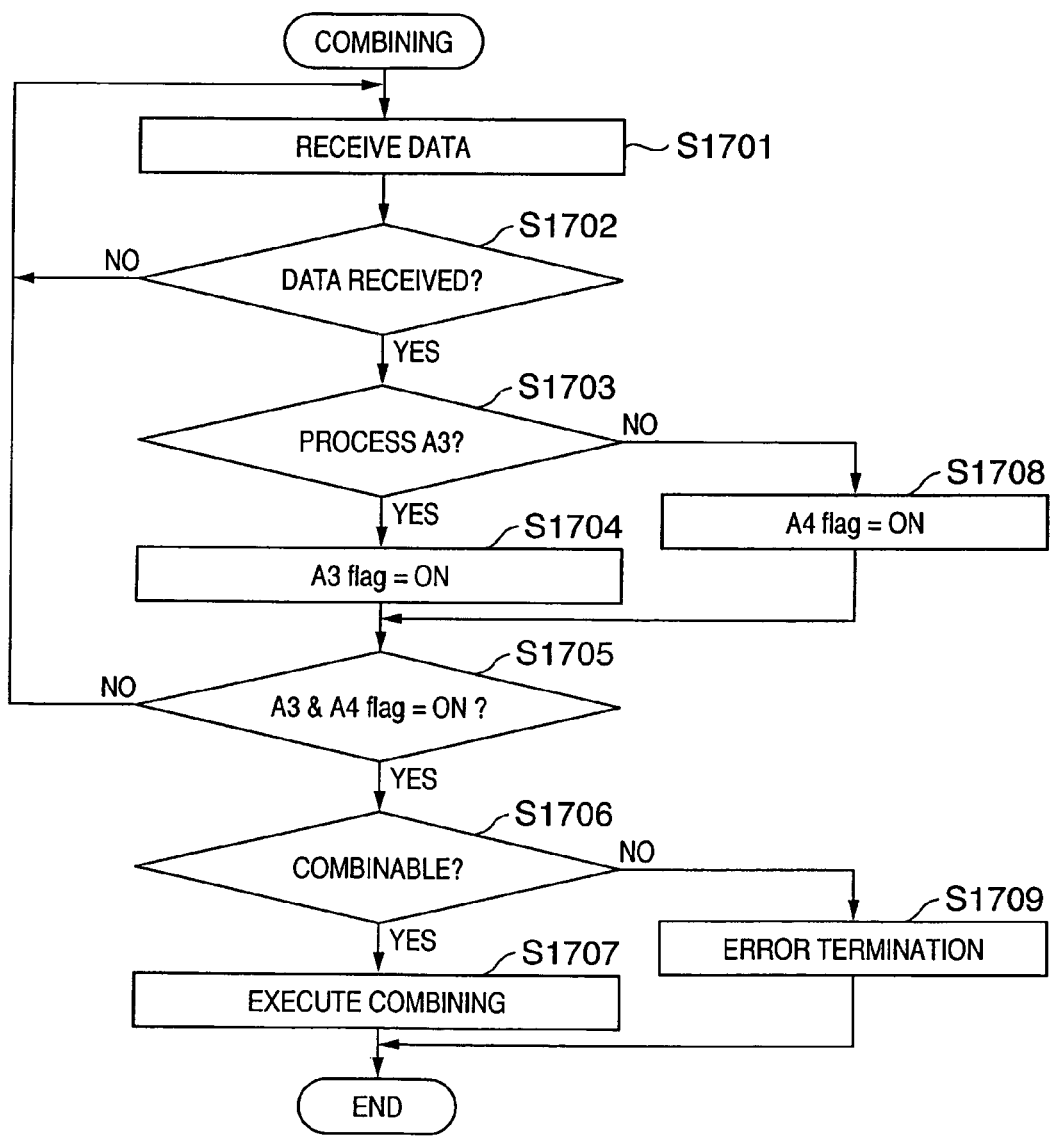
FIG. 17 is a flowchart showing the processing of a combining activity.

FIG. 17 is a flowchart of the processing of the combining activity executed by the workflow execution module 104. For example, the job tickets 801 and 802 are combined in this sequence. A description will be given taking the combining activity 501 shown in FIG. 5.

Referring to FIG. 17, the workflow execution module 104 waits for data reception of the divided job ticket in step S1701. Note that whether or not the received job ticket is the divided job ticket can be checked using the name of the job ticket, as described above. In this example, the job ticket is input to the activity via the workflow execution module 104. However, a given activity may directly pass the job ticket to the next activity. In this case, the execution subject of each activity has a function of determining what is an execution subject of the next activity, and transmitting the job ticket to the determined subject.

The workflow execution module 104 checks in step S1702 if the divided job ticket data is received. If the data is received, the workflow execution module 104 checks in step S1703 from a device of which activity data is received. This checking processing can also be attained based on the name of the received job ticket. For example, upon reception of the job ticket 801 in FIG. 14, the job ticket name is "361212-1-2-3-1/2-4-2/2". Since it is determined based on the job ticket name that this job is a job divided after it advances to the fourth process, the workflow execution module can determine that it acquires the job ticket 801 from the device of the fourth activity. Since the description of FIG. 17 takes the combining activity in FIG. 5 as an example, the processing in step S1703 checks if the data is received from the activity 203. If YES in step S1703, the control advances to step S1704. If the data is not received from the activity 203, since it is received from the activity 204, the control advances to step S1708, and the workflow execution module 104 sets an internally held A4 flag. In step S1704, the workflow execution module 104 similarly sets an internally held A3 flag. The workflow execution module 104 checks in step S1705 if both the A3 and A4 flags are ON. If both the flags are ON, the control advances to step S1706. Note that the processing in steps S1703 to S1705 can be more generalized. For example, since the input data is a job ticket, when the job ticket is received, the workflow execution module 104 refers to information associated with division of a job ticket described in that job ticket. For example, the ID of the job ticket after division represents the ID (or order number) of the activity that caused division, and information indicating the processed or unprocessed part in addition to the original job ticket ID. For this reason, if condition (2) or (3) is met after condition (1) to be described below is met, it is determined that the job tickets are combinable. That is, (1) the job tickets must include the ID of the identical job ticket; (2) the job tickets correspond to partial jobs divided in the same activity; and (3) the job tickets correspond to an unprocessed job divided by a given activity, and an unprocessed part job divided in an activity immediately after that given activity. Note that the "unprocessed job divided by a given activity" means the job ticket ID at the time of division. When the job ticket is input to the combining activity, the processing of the activity of interest of the job corresponding to that job ticket ought to be completed. For example, a detailed explanation will be given using the job tickets 801 and 802 shown in FIG. 14. Since the job ticket names of the two job tickets include the same job ticket ID, they meet condition (1). Also, the job ticket 801 includes a description "-3-1/2" indicating division in process 3, and the job ticket 802 includes a description "-3-2/2" indicating division in process 3. That is, since both the job tickets 801 and 802 are divided in the third process, they meet condition (2). Furthermore, the job ticket 801 includes a description "unprocessed job 4-2/2". On the other hand, the job ticket 802 includes a description "3-2/2". That is, the job ticket 802 is an unprocessed job divided in the third process, and the job ticket 801 is an unprocessed job which is divided in the process immediately after the job ticket 802. Therefore, since the job tickets 801 and 802 meet all conditions (1), (2), and (3), it is determined that they are combinable.

The workflow execution module 104 checks in step S1706 if the job tickets are combinable. The workflow execution module 104 checks continuity of pages of the jobs received from processes A3 and A4 if possible to see if these jobs are combinable. This checking processing is also made when general judgment is made using conditions (1), (2), and (3) above. If it is determined in step S1706 that the job tickets are combinable, the control advances to step S1707. In step S1707, the workflow execution module 104 executes combining processing. Combining is processing for generating a single job ticket by integrating the job tickets of the jobs to be combined. If the job tickets are not combinable, the control advances to step S1709. Step S1709 is an error termination step since the job tickets are not combinable. The processing example of the combining activity has been described.

Upon completion of the combining processing, the workflow execution module 104 transmits the combined job ticket to the processing subject of the next activity in accordance with the workflow information of the workflow in execution (to be referred to as workflow of interest hereinafter). In the example of FIG. 5, the workflow execution module 104 transmits the combined job ticket 901 to the finisher which executes the activity 502.

<Job Ticket Combining User Interface>

Figure 18:
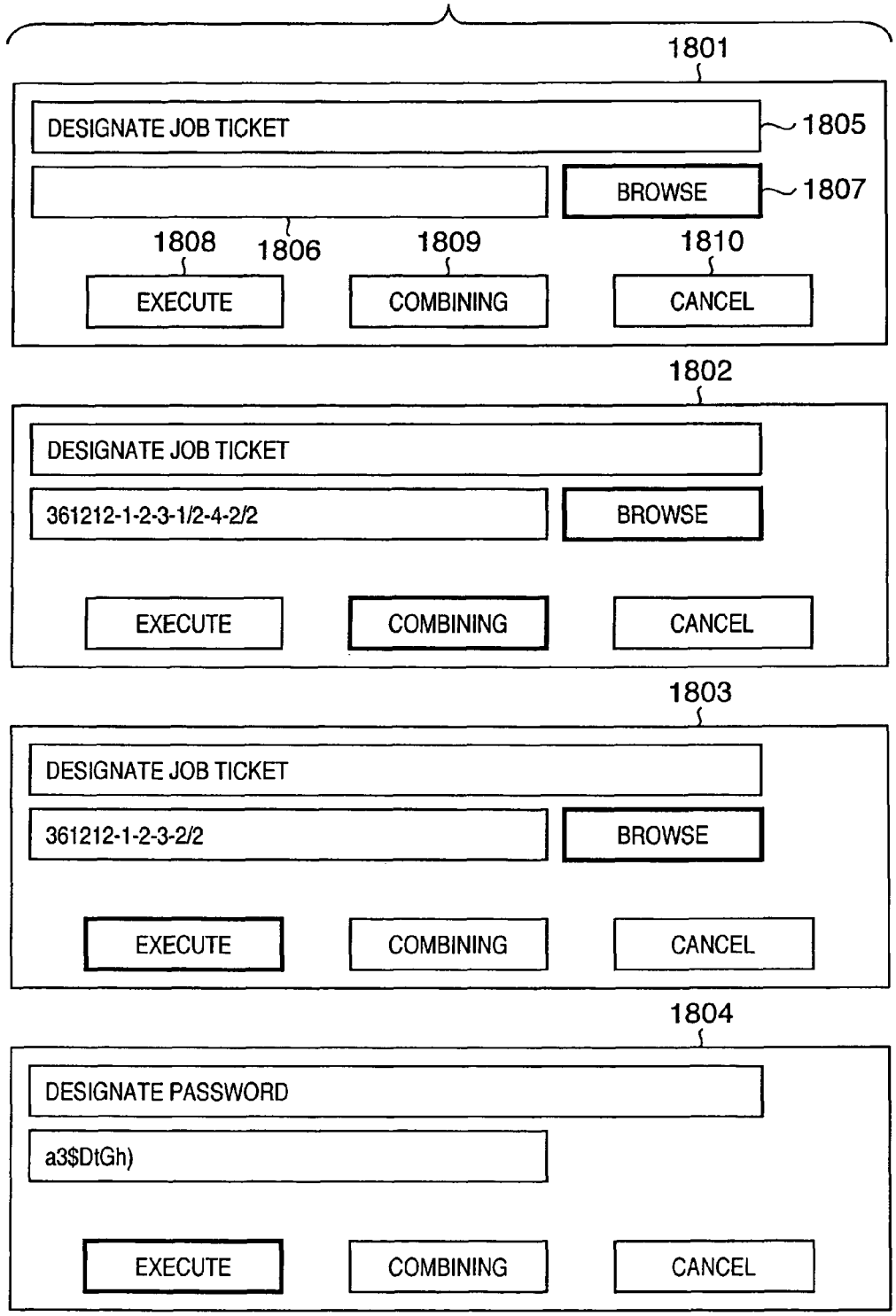
FIG. 18 shows panel display examples upon combining job tickets.

FIG. 18 shows a display example of a panel used upon combining job tickets. The job tickets may be automatically combined if the conditions are met. Alternatively, the user interface shown in FIG. 18 may prompt the user to designate the job tickets to be combined. This user interface is displayed by the program that implements the combining activity. For example, when the operator makes an input to instruct to combine jobs, a window.1801 shown in FIG. 18 is displayed in response to that input. A device that displays this window is the client computer 102. Of course, another device can similarly display the window as long as it executes job combining processing.

The window 1801 is an example of a job ticket input instruction window. A display field 1805 displays a message from the system. A field 1806 is a text input field to which the user inputs the job ticket to be combined. A button 1807 is a browse button used to make a browse search of the job ticket. A button 1808 is an execution button used to execute combining of job tickets. A button 1809 is a combining button used to designate the second job ticket or more. A button 1810 is a cancel button used to leave this job ticket combining display.

A window 1802 is in a display state after the user designates the first job ticket name. In this state, the user can press the combining button. Upon pressing the combining button, the user can input the second job ticket name. A window 1803 is in a display state after the user designates the second job ticket name. The user can press the execution button in this state. A window 1804 is in a display state when the user inputs a combining password (tally password) and presses the execution button. When the user presses the execution button on the window 1804, information including the job ticket names to be combined and the like, which are input in manner of FIG. 18, is transmitted to the workflow execution module 104. When using the user interface of FIG. 18, the workflow execution module 104 combines the designated job tickets in the sequence shown in FIG. 9.

Figure 19:
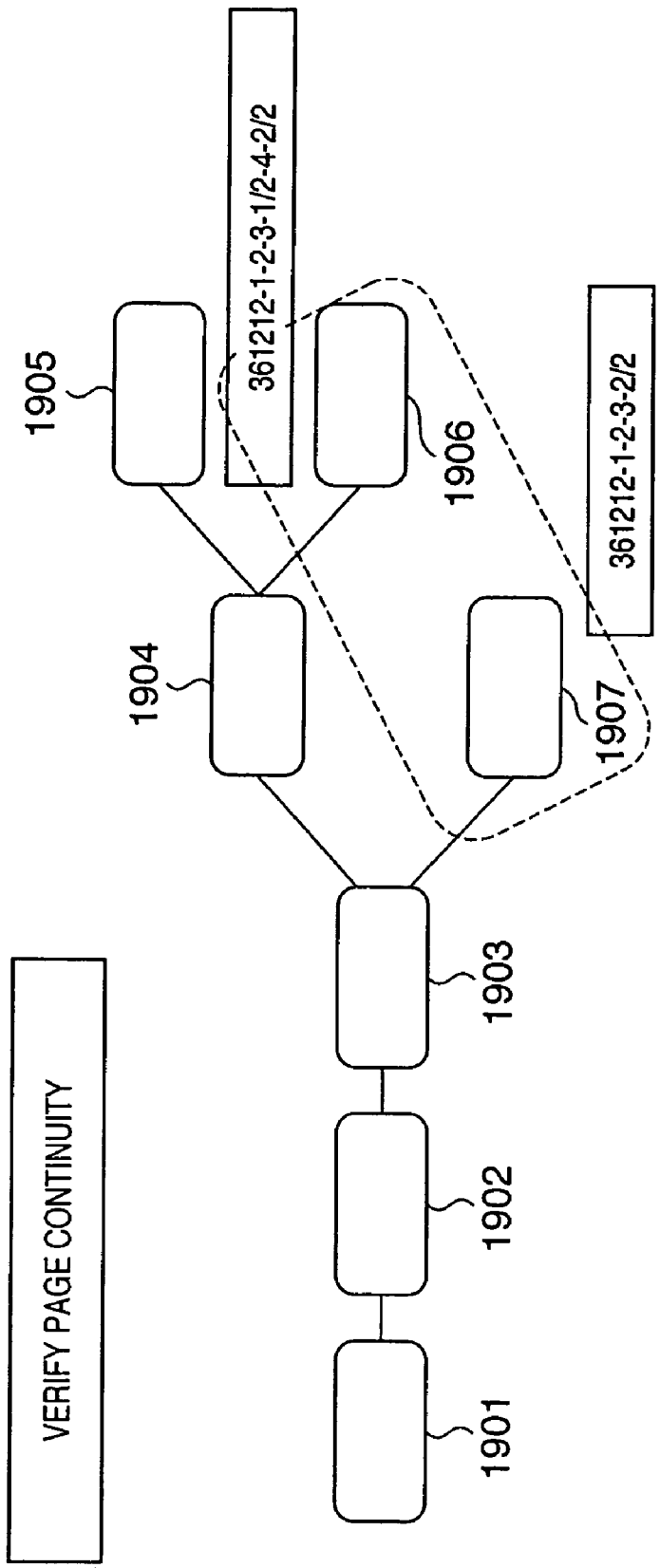
FIG. 19 shows transition of job tickets.
Figure 20:
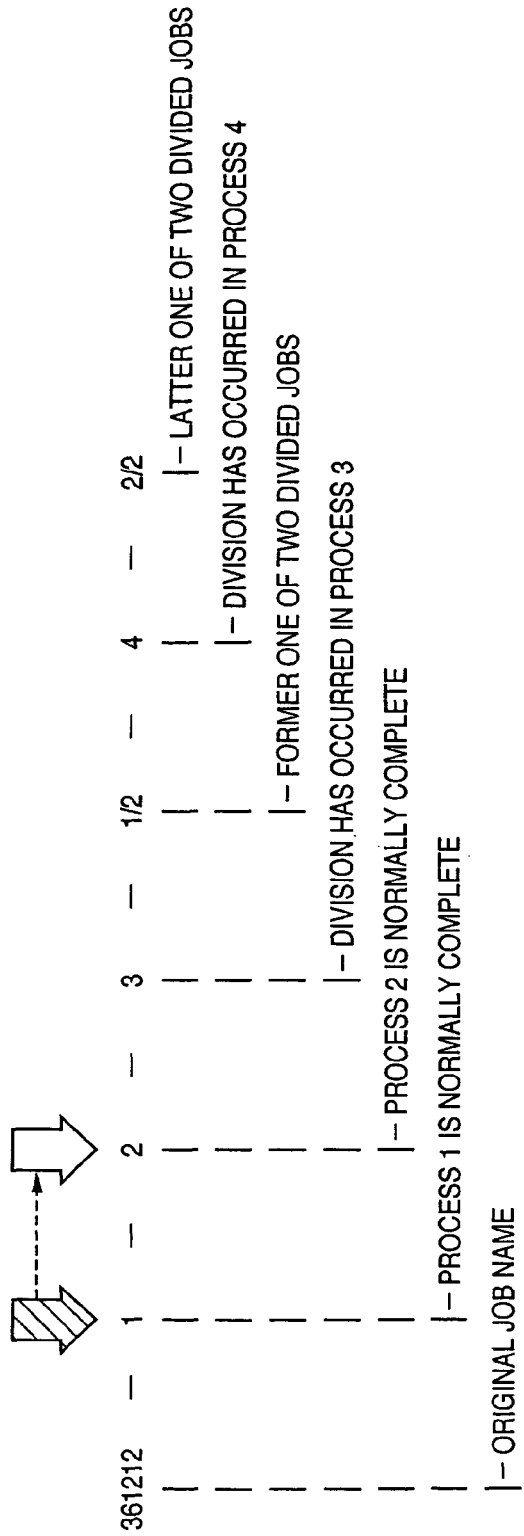
FIG. 20 shows details of job names.

FIG. 19 shows an example of job tickets generated for respective processes. A job ticket 1901 is generated upon executing process A1 of this example, and a job ticket 1902 is generated for process A2. Since no division takes place, the number of job tickets generated in these stages is one. After that, the control advances to process A3, and division takes place there. This indicates that the job ticket 206 is divided into the job tickets 401 and 402. In FIG. 19, a job ticket 1903 is divided into job tickets 1904 and 1907. After that, the job ticket 1904 is further divided into job tickets 1905 and 1906. The job ticket 1906 corresponds to the job ticket 704. In FIG. 19, jobs corresponding to the job tickets 1906 and 1907 have page continuity. Therefore, these job tickets 1906 and 1907 are combinable. Such checking processing is executed in step S1706 in FIG. 17.

<Combinability Checking (Step S1706)>

Figure 21:
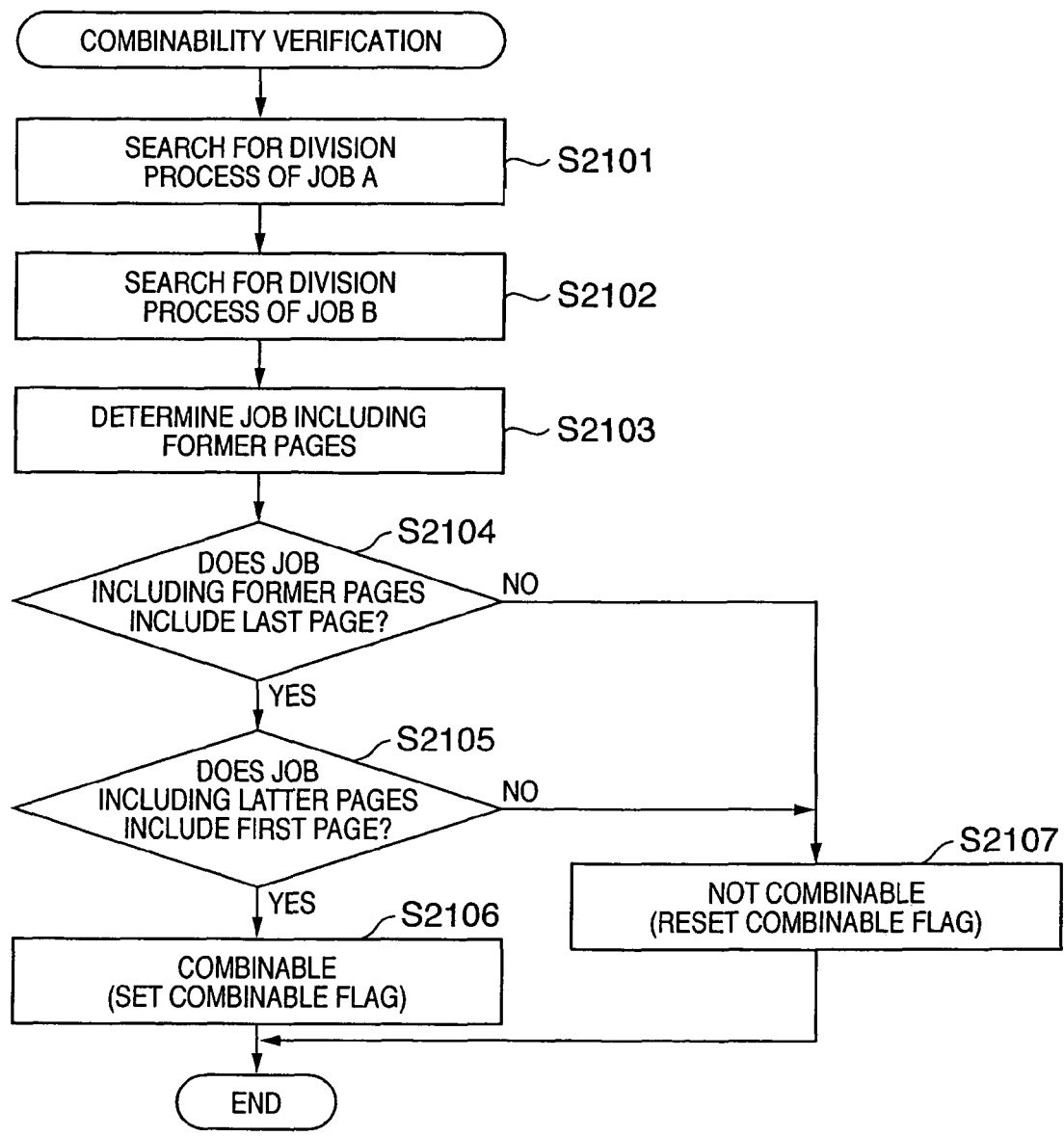
FIG. 21 is a flowchart showing an example of processing for verifying whether or not job tickets are combined.

FIG. 21 is a flowchart of the job ticket combinability checking processing (S1706). The workflow execution module 104 executes the procedure of FIG. 21 based on the data received in step S1701 in FIG. 17. When the user inputs the parameters via the user interface, the workflow execution module 104 executes this procedure based on the parameters input from the user interface in FIG. 18. FIG. 21 shows the procedure for checking if job tickets of two jobs, i.e., jobs A and B, are combinable.

In step S2101, the workflow execution module 104 searches for a division process of job A. In case of FIG. 11, processes A3 and A4 are division processes. This division process can be retrieved based on the input job name. That is, a process prior to the identifier in the fraction format like "1/2" can be determined as the division process. For example, if the job ticket name includes "-3-1/2", the third process is recognized as the division process. In step S2102, the workflow execution module 104 searches for a division process of job B. Note that the search method is the same as that in step S2101. In step S2103, the workflow execution module 104 determines a job including former pages. For example, the workflow execution module 104 executes this step using the value described in the numerator of the identifier in the fraction format, which is described after the same process retrieved in steps S2101 and S2102. That is, the workflow execution module 104 checks the identifier in the fraction format described after the third process. For example, if a job is divided into two jobs, a job including former pages, and that including latter pages are determined. That is, the job name in which the numerator of the identifier in the fraction format after the division process is "1" is determined as the job including former pages. That is, the numerator value in the fraction format indicates the job ticket order. For example, of the job tickets 1906 and 1907 in FIG. 19, the job ticket 1906 includes former pages. The job which is divided in process A3 and includes former pages can be determined based on its job name.

The workflow execution module 104 checks in step S2104 if the job which is determined as the one which includes former pages in step S2103 includes the last page at the time of division. In the example of the job tickets 1906 and 1907, the workflow execution module checks based on the job ticket 1906 if the job ticket 1906 includes the last page of former pages (the last page of the already processed page group)

upon division in the third process. The workflow execution module 104 checks in step S2105 if the job determined as the one which includes latter pages in step S2103 includes the first page at the time of division. In case of the job tickets 1906 and 1907, the workflow execution module checks based on the job ticket 1907 if the job ticket 1907 includes the first page of latter pages (i.e., the first page of the unprocessed page group) upon division in the third process.

The workflow execution module 104 determines in step S2106 that the jobs are combinable or in step S2107 that they are not combinable. If YES in both steps S2104 and S2105, it is determined that the job including former pages and the job including latter pages have page continuity. For this reason, the workflow execution module determines that the plurality of job tickets designated on the UI in, e.g., FIG. 18 are combinable (S2106). That is, upon combining job tickets, the workflow execution module 104 checks if processed parts in the job tickets to be combined in the next or subsequent process of the processing step of interest in which the job ticket is divided are continuous parts. If the processed parts are continuous parts, the workflow execution module 104 combines the job tickets. For example, the workflow execution module 104 sets a flag or the like indicating that the job tickets are combinable in step S2106 or reset it in step S2107. This is the criterion in step S1706 of FIG. 17.

In the above sequence, the combinability checking procedure based on continuity has been described. However, it is not always the case that only the page continuity is used to define the combining condition. If job tickets having no page continuity are combined, no influence may be imposed on the next work.

As described above, according to this embodiment, a new workflow can be generated during execution of the workflow. Then, the processes of these workflows can progress independently from each other. Also, the activities of the respective workflows can be executed using divided job tickets. Even when a cause of interruption of execution of one job has occurred during execution of that job, a part that can be continuously processed is divided, and the processing of that part can progress. For this reason, the time required to complete the entire job can be shortened.

Also, the job tickets can be dynamically combined during execution of the workflow. An activity can be executed using the combined job ticket. For this reason, an activity defined by combining respective parts of divided jobs need not be executed manually, thus improving the productivity of the workflow.

When the operator manually combines output products associated with divided jobs, the processing of the subsequent process must be processed as a combined job. However, the server cannot recognize the combining processing of the output products unless it is specially notified. Hence, the operator who manually combined the output products of a given process inputs the name (job ticket name) of the process that outputs the combined output products, and a combining message to the workflow execution module via a personal computer or the like. Upon reception of the message, the workflow execution module combines the job tickets corresponding to the combined output products to generate a job ticket for the next process. In this way, the manual combining work can be reflected in the workflow, thus simplifying the works.

Second Embodiment

Figure 22:
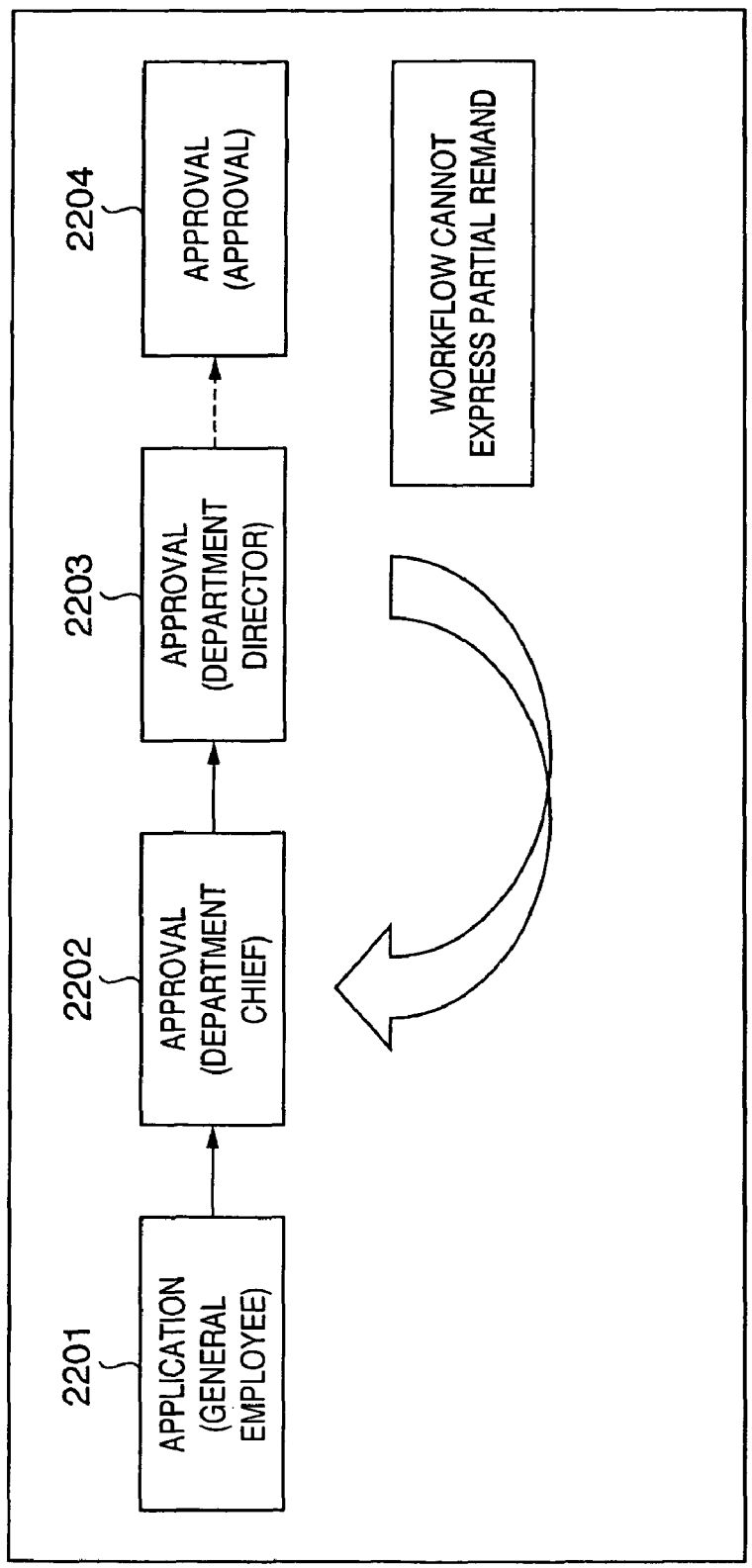
FIG. 22 shows a definition example of a workflow of an approval system.

As another embodiment, a workflow system of an approval system will be described below. FIG. 22 shows a definition example of the workflow of the approval system. Referring to FIG. 22, reference numerals 2201 to 2204 respectively denote activities. The activity 2201 is designed to execute application processing. Such activity includes many office services such as address change, demand for transportation expenses, and the like. A general employee normally executes this work. Upon completion of this activity, the control advances to the activity 2202. The activity 2202 is an approval activity by a department chief. Although not shown, if the department chief gives an approval to the application processing of the activity 2201, he or she may press an approval button; otherwise, he or she may press a "denial button", "remand button", or the like. Likewise, the activity 2203 is an approval activity by a department manager, and the activity 2204 is an approval processing activity by a president.

Some flows make butch approval requests. For example, one activity processes, e.g., 10 copies of application forms to request an approval. In such flow, an approval for only one copy may be remanded in many cases. "Remand" means processing for sending back an application to a low-ranking employee. When this partial remand processing is expressed on a workflow editor, processing may be designed by a plurality of activities, resulting in a complicated, incomprehensible workflow.

Figure 23:
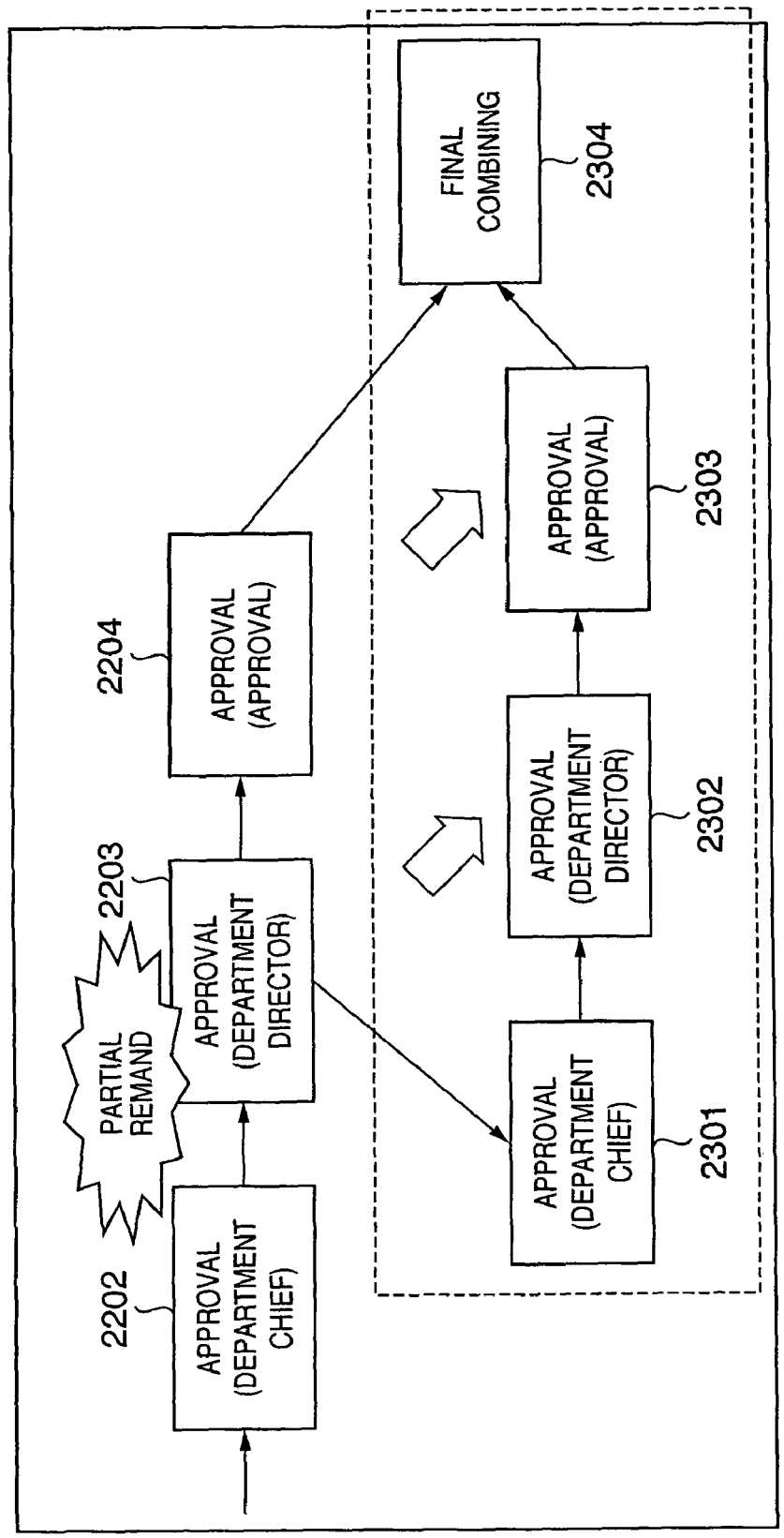
FIG. 23 is a schematic chart showing automatic workflow generation.

FIG. 23 is a schematic chart showing automatic workflow generation according to the present invention. In FIG. 23, the activities 2202 to 2204 are equal to those in FIG. 22. Activities 2301 to 2304 are generated by the automatic workflow generation function of the present invention. In this example, a new activity is generated upon occurrence of a partial remand in the activity 2203. The activity 2301 is an activity to which a partial job remanded in the activity 2203 advances. If the activity 2301 executes approval processing, the control advances to the activity 2302. The activity 2302 can handle the job processed by the copy activity 2301 of the activity 2203. The activity 2303 is a copy activity of the activity 2204. The activity 2303 can handle an end job of the activity 2204. The activity 2304 is a final combining activity. The activity 2304 defines a complete system for the job, and can make approval confirmation.

Figure 24:
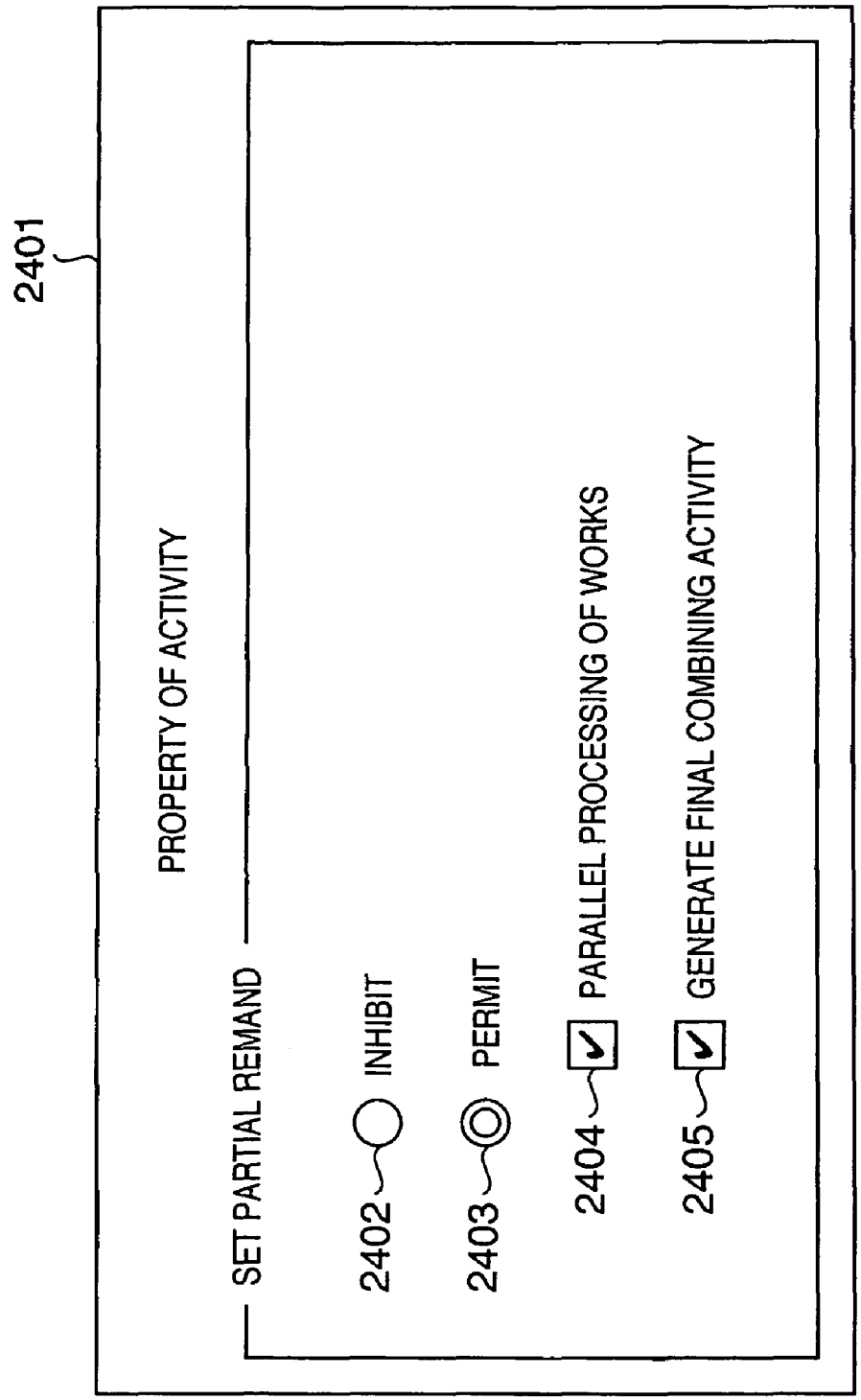
FIG. 24 shows a setting display example of the property of an activity;.

FIG. 24 shows a setting display example of the property of the activity. Referring to FIG. 24, reference numeral 2401 denotes a dialog setting area. For example, this property dialog allows to set different properties for the activities 2201 to 2204. The property dialog allows to set various parameters, and this example shows only some of them. A button 2402 is a radio button used to inhibit partial remand. A button 2403 is a radio button used to permit partial remand. The current setting permits partial remand. A switch 2404 is checked to allow parallel processing of works. Since this switch is checked, the activities 2301 to 2304 are generated. A switch 2405 is used to generate a final combining activity. Since the current setting allows generation of the final combining activity, the activity 2304 is generated.

This embodiment generates a derivative workflow to include activities before an interrupted activity in place of the interrupted activity unlike in the first embodiment. The processing is done in the same manner as in the first embodiment, except for this point. However, an activity as a remand destination cannot be automatically determined in some cases. In such case, upon generation of a derivative workflow, the user designates an activity as a remand destination via a user interface, and workflow information of the original workflow is copied to have the designated activity at the head position. In this way, the derivative workflow is generated and executed.

As described above, according to this embodiment, since a new workflow which returns to an activity before the interrupted activity is generated, remand processing can be executed without defining a workflow in advance.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-359533, filed Dec. 13, 2005, which is hereby incorporated by reference herein in its entirety.

What is claimed is:

1. A non transitory computer-readable medium storing a program which can be executed by the computer which generates a workflow that defines a processing order of a plurality of processes, said program making the computer function as:
   a reception unit adapted to receive a processing status of a processing step of interest of the plurality of processes defined in the workflow from a device which executes processing of the processing step of interest;
   a checking unit adapted to check if the processing status of the processing step of interest received by said reception unit matches a workflow generation condition; and
   a first generation unit adapted to generate, when said checking unit determines that the processing status of the processing step of interest matches the workflow generation condition, a workflow based on the workflow information stored in the storage unit and the processing status of the processing step of interest.

2. The program according to claim 1, wherein said first generation unit generates a combining process which combines output data from a final process of the workflow stored in the storage unit, and output data from a final process of the new workflow generated by said first generation unit, and
   said first generation unit generates the workflow in which the combining process combines the output data from the final process of the original workflow and the output data from the final process of the new workflow.

3. The program according to claim 1, wherein said program makes the computer further function as a second generation unit adapted to generate work instruction data which describes processing contents of each process based on the processing status received by said reception unit, and
   said second generation unit generates first work instruction data corresponding to an processed part in the processing step of interest, and second work instruction data corresponding to an unprocessed part in the processing step of interest based on the processing status.

4. The program according to claim 3, wherein said reception unit receives processing status data from a device assigned to the processing step of interest, and
   said second generation unit generates the first work instruction data which includes processing contents of a process next to the processing step of interest in correspondence with the processed part in the processing step of interest based on the processing status, and generates the second work instruction data which includes contents to be processed by the processing step of interest in correspondence with the unprocessed part.

5. The program according to claim 3, wherein the work instruction data includes information that specifies devices used to execute the respective processes, layout information that specifies a layout of the document in the layout process, print setting information that specifies a print method in the print process, and finishing information setting information that specifies contents of the finishing processing in the finishing process.

6. The program according to claim 1, wherein when said checking unit determines that the processing status received by said reception unit matches the workflow generation condition, said first generation unit generates a new workflow using information corresponding to the processing step of interest and processes after the processing step of interest in the workflow information stored in the storage unit, so as to generate a workflow which includes the processing step of interest assigned to a device as a transmission source of the processing status, and processes after the processing step of interest.

7. The program according to claim 1, wherein the processing status of the device which matches the workflow generation condition is an event that interrupts processing of the device, and said first generation unit generates a new workflow including a process in which the event has occurred and processes after that process to have the processing step of interest at a head position.

8. The program according to claim 1, wherein said program makes the computer further function as a setting unit adapted to set the workflow generation condition, and said checking unit checks if the processing status of the device matches the condition set by said setting unit.

9. The program according to claim 1, wherein an event which matches the workflow generation condition is an input of a request for sending back processing to a process before the processing step of interest in the workflow, and said first generation unit generates workflow information of a new workflow which includes processes after the process as a destination of the send-back request in the workflow to have that processing step of interest at a head position.

10. The program according to claim 1, wherein the workflow includes, as processes, a document reception process of inputting document data, a layout process of laying out the document data input by the document reception process on a sheet surface, a print process of printing the document data laid out by the layout process, and a finishing process of applying finishing processing to paper sheets printed by the print process, and the workflow information includes information that specifies devices used to execute the respective processes, information that indicates a processing order of the respective processes, layout information that specifies a layout of the document in the layout process, print setting information that specifies a print method in the print process, and finishing information setting information that specifies contents of the finishing processing in the finishing process.

11. An information processing apparatus which generates a workflow that defines a processing order of a plurality of processes, and has a storage unit that stores workflow information used to define processing in the respective processes included in the workflow, comprising:

a reception unit adapted to receive a processing status of a processing step of interest of the plurality of processes defined in the workflow from a device which executes processing of the processing step of interest;

a checking unit adapted to check if the processing status of the processing step of interest received by said reception unit matches a workflow generation condition; and a first generation unit adapted to generate, when said checking unit determines that the processing status of the processing step of interest matches the workflow generation condition, a workflow based on the workflow information stored in the storage unit and the processing status of the processing step of interest.

12. The apparatus according to claim 11, wherein said first generation unit generates a combining process which combines output data from a final process of the workflow stored in the storage unit, and output data from a final process of the new workflow generated by said first generation unit, and said first generation unit generates the workflow in which the combining process combines the output data from the final process of the original workflow and the output data from the final process of the new workflow.

13. The apparatus according to claim 11, further comprising a second generation unit adapted to generate work instruction data which describes processing contents of each process based on the processing status received by said reception unit, and wherein said second generation unit generates first work instruction data corresponding to an processed part in the processing step of interest, and second work instruction data corresponding to an unprocessed part in the processing step of interest based on the processing status.

14. The apparatus according to claim 13, wherein said reception unit receives processing status data from a device assigned to the processing step of interest, and said second generation unit generates the first work instruction data which includes processing contents of a process next to the processing step of interest in correspondence with the processed part in the processing step of interest based on the processing status, and generates the second work instruction data which includes contents to be processed by the processing step of interest in correspondence with the unprocessed part.

15. The apparatus according to claim 13, wherein the work instruction data includes information that specifies devices used to execute the respective processes, layout information that specifies a layout of the document in the layout process, print setting information that specifies a print method in the print process, and finishing information setting information that specifies contents of the finishing processing in the finishing process.

16. The apparatus according to claim 11, wherein when said checking unit determines that the processing status received by said reception unit matches the workflow generation condition, said first generation unit generates a new workflow using information corresponding to the processing step of interest and processes after the processing step of interest in the workflow information stored in the storage unit, so as to generate a workflow which includes the processing step of interest assigned to a device as a transmission source of the processing status, and processes after the processing step of interest.

17. The apparatus according to claim 11, wherein the processing status of the device which matches the workflow generation condition is an event that interrupts processing of the device, and said first generation unit generates a new workflow including a process in which the event has occurred and processes after that process to have the processing step of interest at a head position.

18. The apparatus according to claim 11, further comprising a setting unit adapted to set the workflow generation condition, and wherein said checking unit checks if the processing status of the device matches the condition set by said setting unit.

19. The apparatus according to claim 11, wherein an event which matches the workflow generation condition is an input of a request for sending back processing to a process before the processing step of interest in the workflow, and said first generation unit generates workflow information of a new workflow which includes processes after the process as a destination of the send-back request in the workflow to have that processing step of interest at a head position.

20. The apparatus according to claim 11, wherein the workflow includes, as processes, a document reception process of inputting document data, a layout process of laying out the document data input by the document reception process on a sheet surface, a print process of printing the document data laid out by the layout process, and a finishing process of applying finishing processing to paper sheets printed by the print process, and the workflow information includes information that specifies devices used to execute the respective processes, information that indicates a processing order of the respective processes, layout information that specifies a layout of the document in the layout process, print setting information that specifies a print method in the print process, and finishing information setting information that specifies contents of the finishing processing in the finishing process.

21. A workflow generation method in an information processing apparatus which generates a workflow that defines a processing order of a plurality of processes, and has a storage unit that stores workflow information used to define processing in the respective processes included in the workflow, comprising:

a reception step of receiving a processing status of a processing step of interest of the plurality of processes defined in the workflow from a device which executes processing of the processing step of interest;

a checking step of checking if the processing status of the processing step of interest received in the reception step matches a workflow generation condition; and a first generation step of generating, when it is determined in the checking step that the processing status of the processing step of interest matches the workflow generation condition, a workflow based on the workflow information stored in the storage unit and the processing status of the processing step of interest.

* * * * *